(12) United States Patent
Phillips

(10) Patent No.: US 7,779,064 B2
(45) Date of Patent: Aug. 17, 2010

(54) METHOD AND SYSTEM FOR EFFICIENT AND DYNAMICALLY ADAPTABLE DIGITALLY-ENCODED-INFORMATION DISTRIBUTION

(75) Inventor: Mark E. Phillips, Seattle, WA (US)

(73) Assignee: MOD Systems Incorporated, Seattle, WA (US)

( * ) Notice: Subject to any disclaimer, the term of this patent is extended or adjusted under 35 U.S.C. 154(b) by 146 days.

(21) Appl. No.: 11/974,918

(22) Filed: Oct. 15, 2007

(65) Prior Publication Data

US 2008/0133546 A1  Jun. 5, 2008

Related U.S. Application Data

(60) Provisional application No. 60/851,631, filed on Oct. 13, 2006.

(51) Int. Cl.
*G06F 15/16* (2006.01)
(52) U.S. Cl. .................................................. 709/201
(58) Field of Classification Search ................. 709/201
See application file for complete search history.

(56) References Cited

U.S. PATENT DOCUMENTS

| | | | |
|---|---|---|---|
| 6,697,944 B1 | 2/2004 | Jones et al. | |
| 6,859,791 B1 * | 2/2005 | Spagna et al. | 705/51 |
| 2003/0220835 A1 * | 11/2003 | Barnes, Jr. | 705/14 |
| 2004/0010601 A1 * | 1/2004 | Afergan et al. | 709/229 |
| 2005/0044280 A1 * | 2/2005 | Reisman | 710/1 |

\* cited by examiner

*Primary Examiner*—Wing F Chan
*Assistant Examiner*—Andrew Woo
(74) *Attorney, Agent, or Firm*—Fenwick & West LLP

(57) ABSTRACT

Embodiments of the present invention include efficient and dynamically self-adaptive digitally-encoded-information distribution systems that monitor digitally-encoded information transactions in order to continuously reconfigure themselves by redistributing stored digitally-encoded information among computer systems that together compose the digitally-encoded-information distribution systems and by dynamically balancing tradeoffs between storing particular encodings of particular information objects and generating particular encodings of particular information objects only as needed to satisfy requests. Distribution efficiency is further optimized by ensuring that the types, configurations, capacities, and capabilities of requesting consumer-electronics devices are accurately and precisely determined, so that stored information appropriately encoded for requesting consumer-electronics devices can be efficiently located or generated for rapid delivery to requesting devices.

9 Claims, 27 Drawing Sheets

User_Preferences

| system_ID | cost factor | time factor | quality factor | format pref 1 | format pref 2 |
|---|---|---|---|---|---|
| | | | | | |
| | | | | | |
| | | | | | |

Figure 3H

METHOD AND SYSTEM FOR EFFICIENT AND DYNAMICALLY ADAPTABLE DIGITALLY-ENCODED-INFORMATION DISTRIBUTION

CROSS-REFERENCE TO RELATED APPLICATION

This application claims the benefit of U.S. Provisional Application No. 60/851,631, filed Oct. 13, 2006.

TECHNICAL FIELD

The present invention is related to distribution of electronically encoded information, including digitally encoded music, movies, multi-media presentations, computer games, and other digitally-encoded content, from information-warehouse-like servers to various consumer-electronics devices on which the digitally-encoded information is rendered to users.

BACKGROUND OF THE INVENTION

For many years, various types of recorded information, including recorded audio information encoded on phonograph records, books and other printed information, and, later, video tapes and DVDs, were distributed for retail sale from manufacturing facilities to central warehouses and distribution centers, from central distribution centers to regional and local distribution centers, and from regional and local distribution centers to retail stores for sale to consumers. This distribution method was relatively efficient, given the information-storage and communications technologies and the transportation system available at the time. However, distribution systems based on this method tended to be relatively static and rigid, as a result of which the distribution systems were characterized by relatively slow and deliberate adaptation to changing technologies, transportation systems, and consumer demand. With the advent of inexpensive personal computers, the Internet, Internet retailing, new types of information encoding, transmission, and storage, new information-distribution methods and systems have been developed and, in many cases, have rapidly overtaken and replaced the static and rigid recorded-information distribution systems designed for older technologies and transportation systems.

Distribution and retailing of digitally-encoded information through computer networks and communications systems directly to various portable devices, including MP3 players, cell phones, portable media players, and other such consumer-electronics devices is poised to largely supplant all previously used distribution channels and methods. Sales of audio CDs are generally flat, or declining, and sales of films and video encoded on DVDs are expected to rapidly decline as direct distribution of digitally encoded movies, music, multi-media presentations, and other digitally-encoded information allows consumers to quickly and efficiently download digital information onto various consumer-electronics devices from retail kiosks and personal computers.

Currently, the existence of various different standards and technologies for digitally encoding information, distributing the digitally-encoded information, and rendering the digitally-encoded information on various consumer-electronics devices has presented a challenge to digitally-encoded information distributors and retailers. While, for example, computer systems continue to rapidly advance in data-storage capacity and processing speeds, and electronic communications systems continue to rapidly advance in bandwidth, the relatively large amount of digitally-encoded information produced by encoding consumer-desired information objects, particularly movies, in a single format and according to one set of encoding parameters challenge designers, implementers, and users of digital-information-distribution systems based on computers and communications systems to provide sufficiently rapid delivery to the consumer-electronics devices of requesting users. However, considering the fact that there are many different types of consumer-electronics devices, each type often compatible with a subset of the many different formats for digitally-encoded information and optimally rendering a subset of the many different encodings that can be produced within a given encoding format by varying various encoding parameters, the task of efficient storing and delivering digitally-encoded information to consumer-electronics devices is extremely challenging. For this reason, designers, implementers, and users of digitally-encoded information-distribution systems continue to recognize the need for more efficient methods for storing and transmitting digitally-encoded information and faster methods for delivering digitally-encoded information to consumers through retailing systems and personal computers.

SUMMARY OF THE INVENTION

Embodiments of the present invention include efficient and dynamically self-adaptive digitally-encoded-information distribution systems that monitor digitally-encoded information transactions in order to continuously reconfigure themselves by redistributing stored digitally-encoded information among computer systems that together compose the digitally-encoded-information distribution systems and by dynamically balancing tradeoffs between storing particular encodings of particular information objects and generating particular encodings of particular information objects only as needed to satisfy requests. Distribution efficiency is further optimized by ensuring that the types, configurations, capacities, and capabilities of requesting consumer-electronics devices are accurately and precisely determined, so that stored information appropriately encoded for requesting consumer-electronics devices can be efficiently located or generated for rapid delivery to requesting devices.

BRIEF DESCRIPTION OF THE DRAWINGS

FIGS. 3A-H show portions of relational-database tables that may be used, in an exemplary embodiment of the present invention, to computationally model a content-distribution system.

DETAILED DESCRIPTION OF THE INVENTION

Embodiments of the present invention are directed to efficient and self-adaptive digitally-encoded information-distribution systems and methods employed by these systems. In the following discussion, the word "content" refers to information, including movies, musical recordings, multi-media presentations, computer games, and other such information. In general, there are many different ways of encoding any particular content object, such as an audio recording or movie. There are different, fundamental types of encoding that produce different types of digitally encoded objects, or formats, and there are, additionally, various parameters associated with encoding may be varied, for any particular format, to produce tens, hundreds, thousands, or more different possible encodings of any particular content. A content-object instance is a particular digital encoding of a content object. A content-distribution system receives requests from users for download of content objects to the users' consumer-electronics devices, and, in response, delivers content-object instances to the users' consumer-electronic devices. In general, a content object is requested by a user, the user additionally supplying desired characteristics, and a content-object instance is returned by the content-distribution system to the user that is compatible with the user's specifications and that is compatible with the user's consumer-electronics device.

A particular consumer-electronics device may be capable of recognizing and rendering only one or a small number of the different encoding formats, and only a small subset of the different encodings possible within the small number of the different encoding formats. The many different possible encodings produced by varying various encoding parameters may produce different file sizes, bit rates produced when decoding information encoded according to the parameters, and may produce various different resolutions, color fidelity, and other qualities when rendered to a user. One goal of the various embodiments of the present invention is to efficiently distribute digitally-encoded content through a self-adaptive, distributed content-distribution system in order to satisfy constraints associated with particular consumer devices, desired levels of quality, and desired speed of delivery of the content to the consumer-electronics device. Although direct distribution of digitally-encoded content is currently provided to particular types of consumer-electronics devices, current content-distribution systems are generally constrained to offering only one or a few different encoding formats, a limited selection of content, and often provide slower-than-acceptable delivery.

Figure 1:
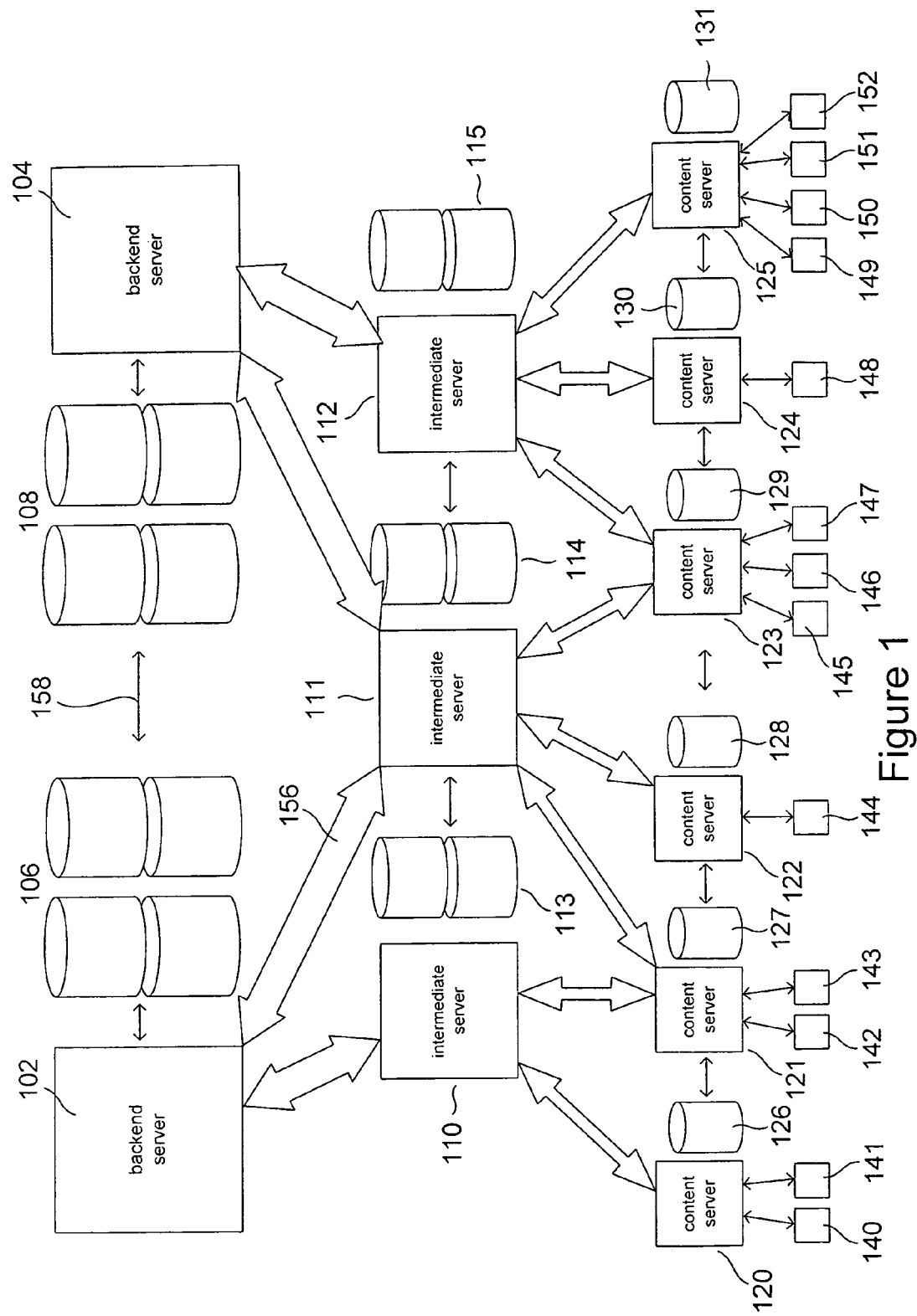
FIG. 1 illustrates a hierarchical hardware and communications platform on which methods of the present invention can be practiced to create an efficient and self-adaptive distributed content-distribution system.

FIG. 1 illustrates a hierarchical hardware and communications platform on which methods of the present invention can be practiced to create an efficient and self-adaptive distributed content-distribution system. The hardware and communications platform includes two high-powered back-end servers 102 and 104, each associated with relatively large data-storage facilities 106 and 108, respectively. The back-end servers 102 and 104 receive requests from, and transmit digitally-encoded content to, a number of intermediate servers 110-112. Each intermediate server is associated with a data-storage facility or data-storage component 113-115, respectively. The intermediate servers 110-115, in turn, receive requests from, and deliver content to, a number of content servers 120-125, each associated with a data-storage component 126-131, respectively. The content servers are generally kiosk-like content-delivery systems in retail locations or personal computers. In the following discussion, the term "server" is used interchangeably with the phrase "computer system." The nodes, or computer systems, within a distributed content-distribution system are generally referred to as servers, since they receive requests for content objects from other nodes and return content objects to the requesting nodes. However, in the case of intermediate servers and content servers, the servers also make requests to other nodes and receive content objects in response to those requests. Consumers connect electronic devices, such as portable media players, 140-152 to content servers and employ a user interface provided by the content servers in to browse available content, purchase particular content items, and download content from the content-distribution system to their consumer-electronics devices.

FIG. 1 is a simple, conceptual model for a distributed content-distribution-system hardware and communications platform. Smaller systems may comprise only back-end servers and content servers, and larger systems may comprise many different levels of intermediate servers between back-end servers and content servers, the number of levels varying in accordance with variation in demand for content over geographical areas, populations, and communications facilities.

A distributed content-distribution-system hardware and communications platform may include two to tens of hierarchical levels, and a particular hierarchical level may include tens, hundreds, thousands, or more computer systems and devices. Requests for content and content-delivery transmissions are generally hierarchical in nature, with requests for content made by a device or server at a first level within the distributed content-distribution-system transmitted to a sever at a second, higher level within the distributed content-distribution-system, as indicated by the large arrows, such as arrow 156, in FIG. 1. In certain distributed content-distribution systems, servers may also be interconnected within levels, as indicated by the smaller arrows, such as arrow 158, for exchange of information and digitally-encoded content. The methods of the present invention can be applied to a huge number of different possible types of computer-system-and-communications-systems platforms, from small systems designed to distribute digitally-encoded content within a small, local region to enormous and complex content-distribution systems that distribute digitally-encoded content throughout the world.

The physical structure of a computer-system-and-communications-system platform, an example of which is shown in FIG. 1, is internally represented by a stored data. The data may be stored in flat files, may be hierarchically organized within formatted files, and may be stored in various types of database systems, including relational database management systems ("RDBMSs"), object-oriented database systems, and other types of databases. In the following discussion, a relatively standard RDBMS system that supports the SQL relational-database query language is assumed, but any type of organized data-storage system may instead be used.

Figure 2:
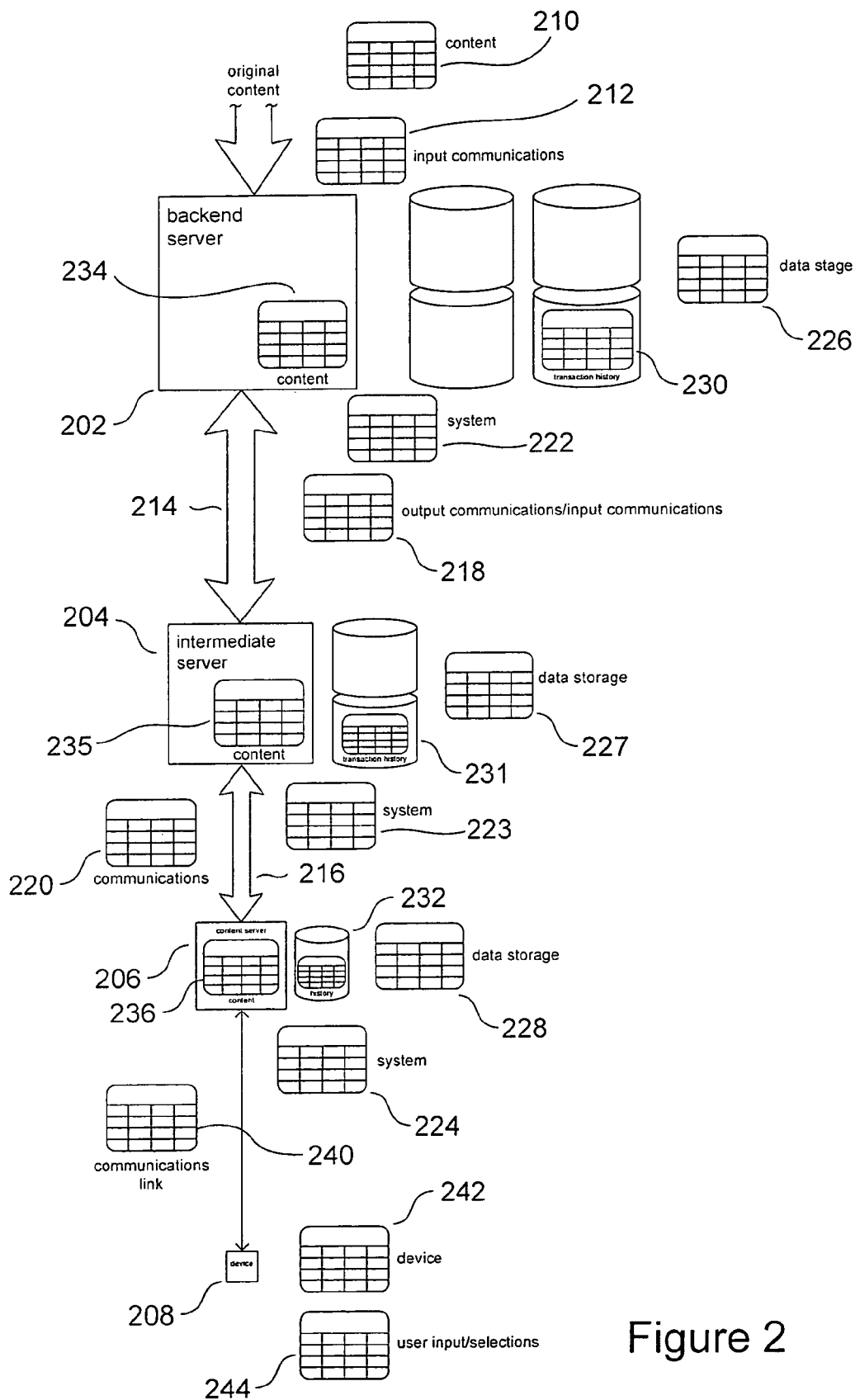
FIG. 2 shows a vertical slice through the hierarchical content-distribution-system platform shown in FIG. 1.

FIG. 2 shows a vertical slice through the hierarchical, distributed content-distribution-system platform shown in FIG. 1. FIG. 2 shows a single back-end server 202 interconnected with an intermediate server 204, in turn interconnected with a content server 206 to which a consumer-electronics device 208 is connected in order to download digitally-encoded content. Multiple types of data may be stored within the hierarchical, distributed content-distribution system in order to represent and model the system, computationally. For example, content received from outside content-production entities may be described by a content table 210 that includes entries describing each received content object. The communications links through which content is received may each be described by a communications table 212. Similarly, each communications link between computer systems within the content-distribution system, such as communications links 214 and 216, may also be represented by rows, or entries, in communications tables 218 and 220, respectively. Each computer system within the content-delivery system may be described by stored data, represented in FIG. 2 by tables 222-224. The data-storage facilities within or associated with each computer system may also be described by stored data, shown as tables 226-228 in FIG. 2. Each computer system within the content-distribution system may store a history of transactions and exchanges with other systems, represented in FIG. 2 by tables 230-232. The content objects stored within each computer system may also be represented by stored data, shown in FIG. 2 as tables 234-236. The type of communications link through which a consumer-electronics device 208 is connected to a content server 206 may be represented by stored data, represented in FIG. 2 by table 240. In addition, the different types of consumer-electronics devices may be represented by stored data, shown as table 242 in FIG. 2. Finally, consumers may interact with the content-distribution system through menu-driven interactions that result in user input, including content-object selections, which may also be stored within the content-distribution system as stored data, represented by table 244 in FIG. 2.

In certain content-distribution systems that represent embodiments of the present invention, each computer system, whether a back-end server, intermediate server, or content server, may store only information related to that computer system and to transactions directly involving that computer system. Alternatively, in other content-distribution systems, each computer system within the content-distribution system may store a global representation of all of the computer systems, content, communications links, and transaction histories generated throughout the content-distribution system that is updated and maintained by distributed-database techniques. In many content-distribution systems that represent embodiments of the present invention, the stored data include both data directly pertaining to the local computer system and transaction histories directly related to the local computer system as well as a certain amount of global data, with the amount of global data maintained within a computer system varying with the level of the computer system within the content-distribution-system hierarchy.

Figure 3A:
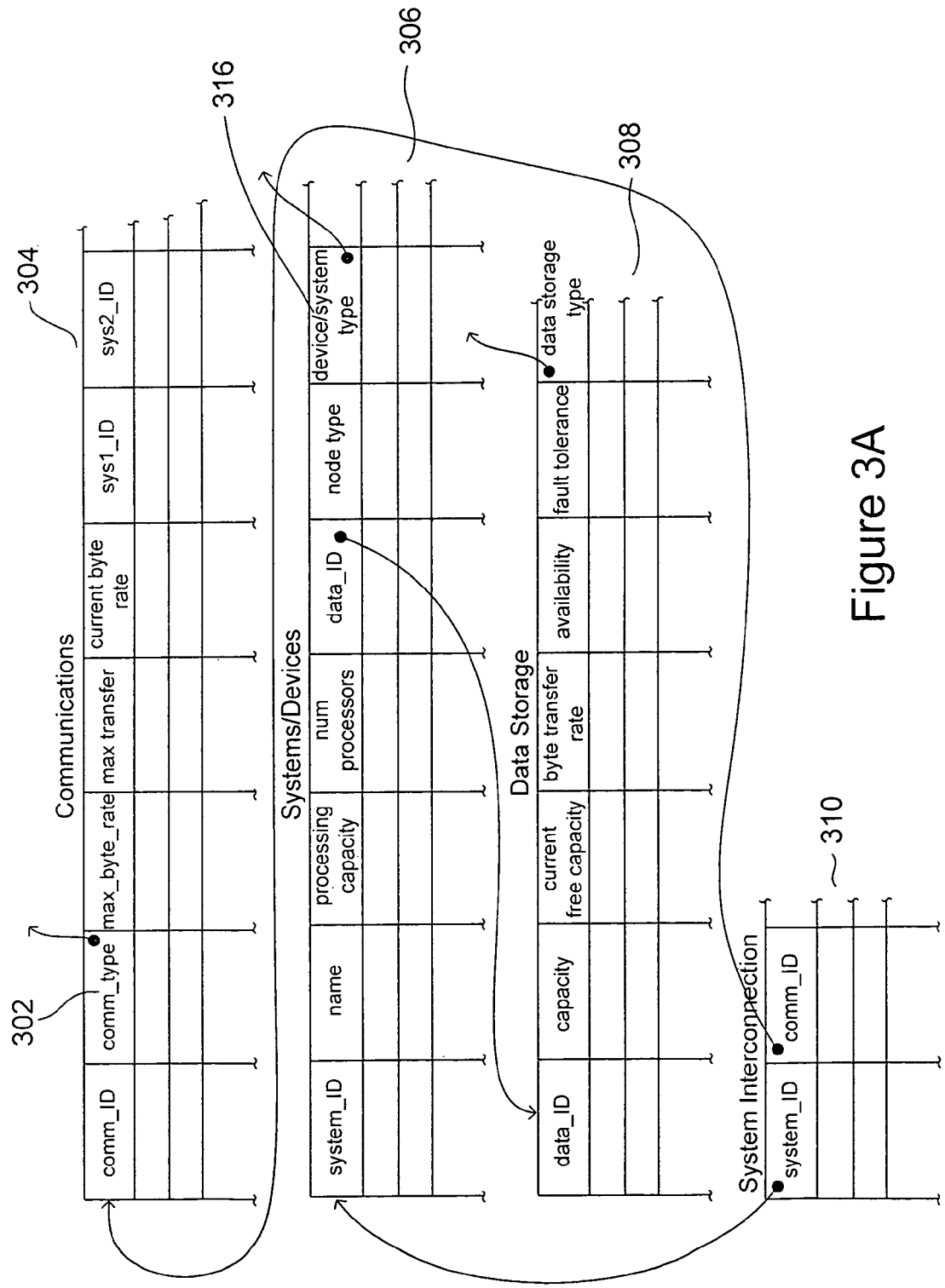

FIGS. 3A-H show portions of relational-database tables that may be used, in an exemplary embodiment of the present invention, to computationally model a content-distribution system. FIG. 3A shows portions of RDBMS tables that describe the communications links, computer systems, and data-storage facilities within a computer-system-and-communications-systems platform for a content-distribution system, such as that shown in FIG. 1. In FIG. 3A, and in FIGS. 3B-H that follow, a portion of an RDBMS table is shown as a portion of column headers, or field names, for the rows of the table, along with portions of several rows to indicate that each table contains multiple entries, each entry, or row, having values appropriate for the various fields listed as column headers or field names. In FIGS. 3A-H, fields that include a small, shaded disk from which an arrow emanates, such as field 302 in the communications table 304 in FIG. 3A, indicate fields with values equal to values included in a column of another table. For example, in the communications table, the field comm_type refers to a key value listed in another table that most likely contains rows, each representing a different type of communications link, each different type of communications link identified by a unique key value, or comm_type value. The SQL table-creation code is not provided, because the tables shown in FIGS. 3A-H are meant to illustrate examples of the general data representations that might be employed within a content-distribution system, rather than details of a specific implementation for a specific content-distribution system.

The exemplary communications table 304 contains rows, each representing a different communications link connecting a first particular computer system to a second computer system within all or a subset of the computer systems, or servers, that together compose the distributed content-distribution system. Each communications link is identified by a unique identifier, comm_id. Each communications link is additionally characterized by various values, such as the maximum number of bytes that can be transmitted per second, a maximum size, in bytes, for a particular data transfer via the communications link, a current byte rate for the link under current load conditions, and the identifiers of computer systems within the content-distribution system linked by the communications link. Communications table 304 shown in FIG. 3A may contain many additional fields, as indicated by the broken lines at the right of the table, and may contain a very large number of entries, or rows, depending on the size of the content-distribution system and the portion of the content-distribution system represented by the communications table.

The systems/devices table 306 includes entries that characterize each computer system or consumer-electronics device currently resident within the content-distribution system. Each computer system or device is characterized by a unique identifier, a name, an indication of the data-storage facility or component associated with the computer system or device, an indication of the device or system type, and other such information. The data-storage table 308 similarly characterizes the different data-storage components and data-storage facilities that may be included in, or associated with, computer systems or consumer-electronics devices. The data-storage components or systems have unique IDs, and are characterized by capacity, current free capacity, transfer rate in bytes per second, indications of overall availability and fault tolerance, and an indication of the type of data-storage component or facility. A system interconnection table 310 includes pairs of system IDs and communications IDs that indicate the communications links available to each computer system or electronic device within the content-distribution system.

Figure 3B:
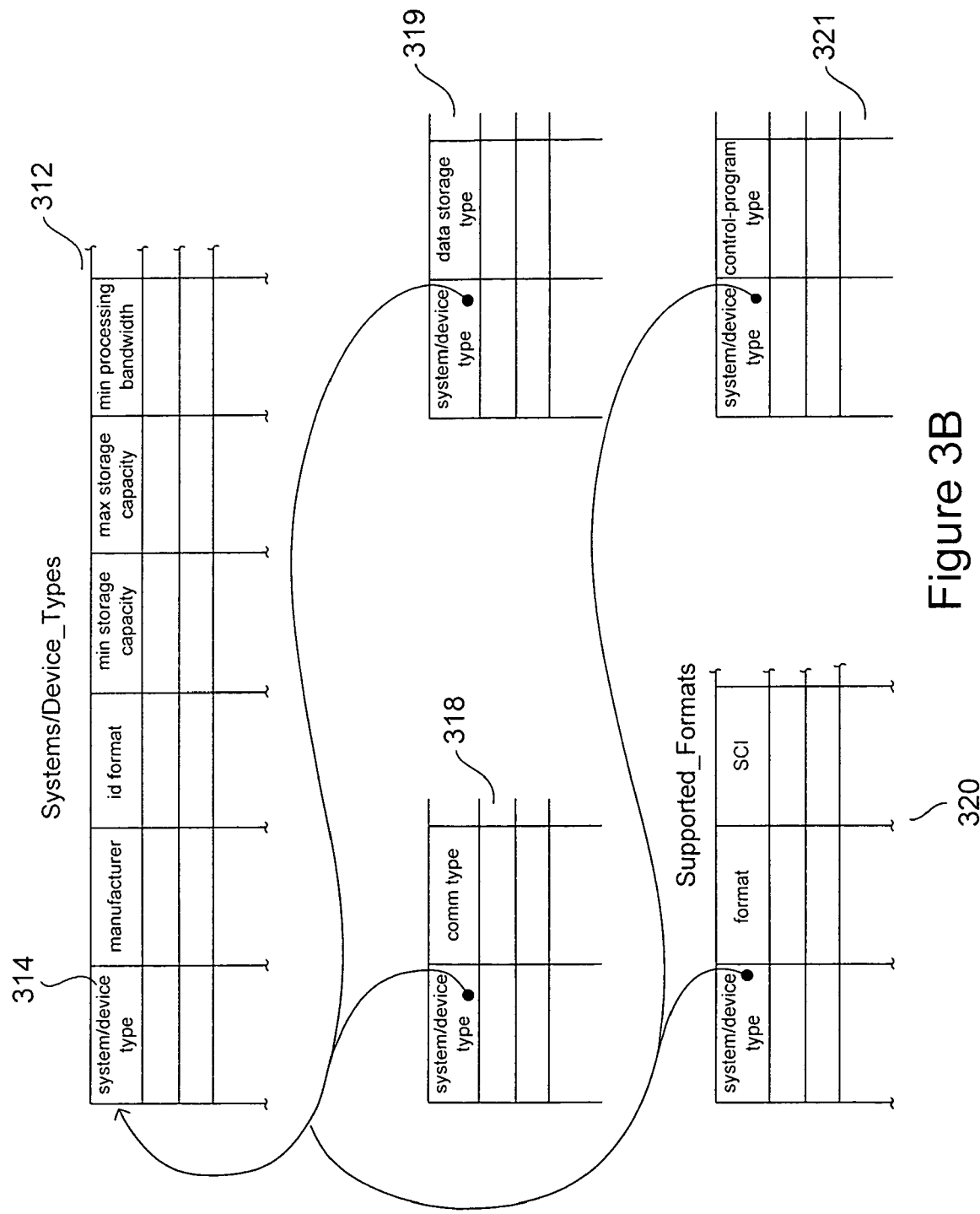

In FIG. 3B, a number of different tables together describe each different type of computer system or consumer device that may reside within, or be connected to, the content-distribution system. The systems/device_types table 312 describes each different type of computer system or consumer-electronics device. Each different type of computer system or electronic device is uniquely identified by a systems/device type value 314 which is used to identify system/device types for specific devices and computer systems within the content-distribution system in column 316 of the system/devices table 306 in FIG. 3A. Fields within the systems/device_types table specify the manufacturer of a system or device, an ID format for device identification stored within the system or device, a minimum storage capacity, a maximum storage capacity, a minimum processing bandwidth, and other such characteristics. In addition, numerous additional tables 318-321 describe various types of communications links that may be attached to the system or device, the various types of data-storage components or facilities that may be associated with each type of system or device, types of content formats that may be processed with the systems and devices, and the types of operating systems or control programs that may run on the different systems and devices.

Figure 3C:
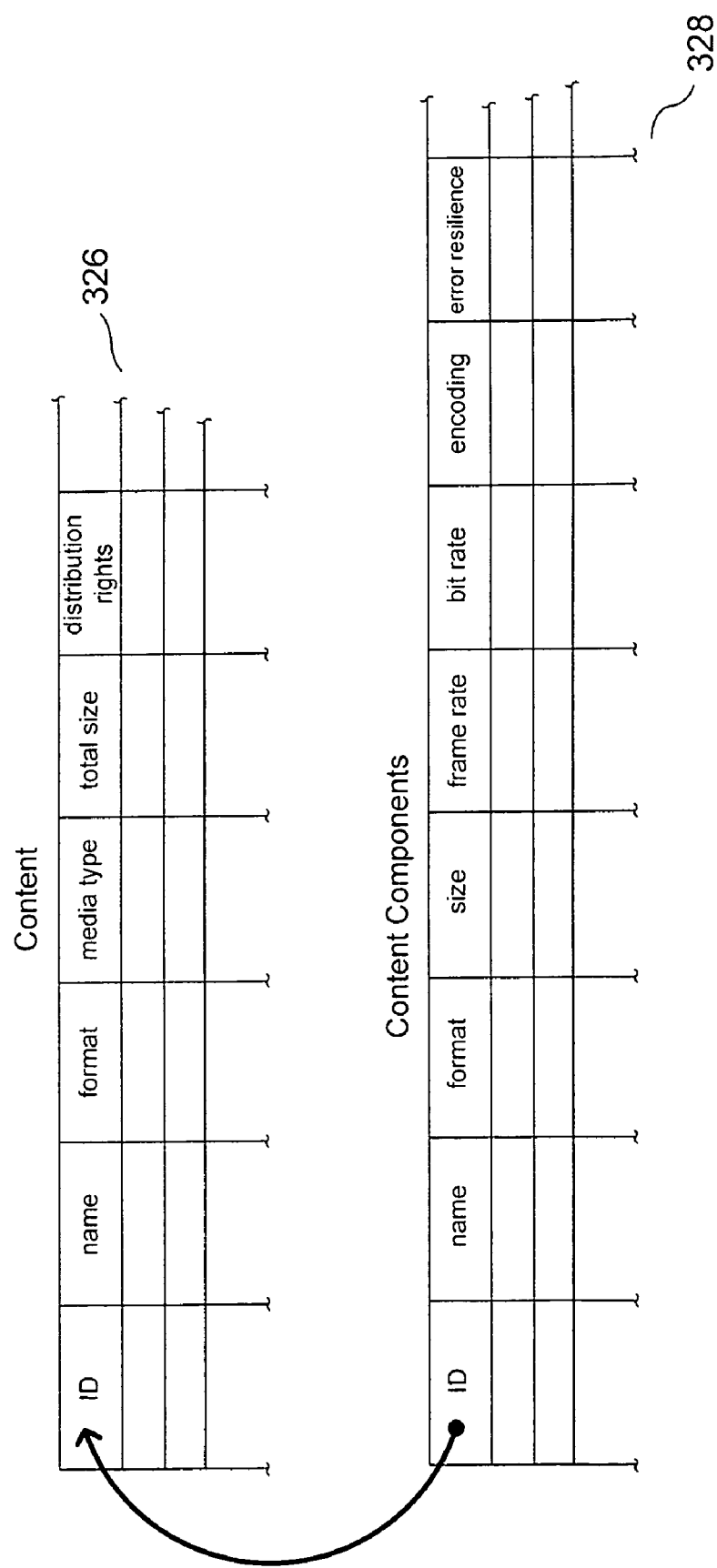

FIG. 3C shows two tables, content 326 and content_components 328, that together describe each of the content objects furnished to, or stored within, the content-distribution system. Each content object, described by a row in the content table 326, may be composed of one or more content components, such as files, each described by an entry in the content_components table 328. Each content object may be described by a name, encoding or format type, a total size, an indication of distribution rights, and other such characteristics and values, and each component of a content object may be individually characterized by name, format, size, frame rate for rendering, bit rate used by a decoder, an indication of a particular encoding employed to encode the content component, and an indication of the error resilience of the encoding.

Figure 3D:
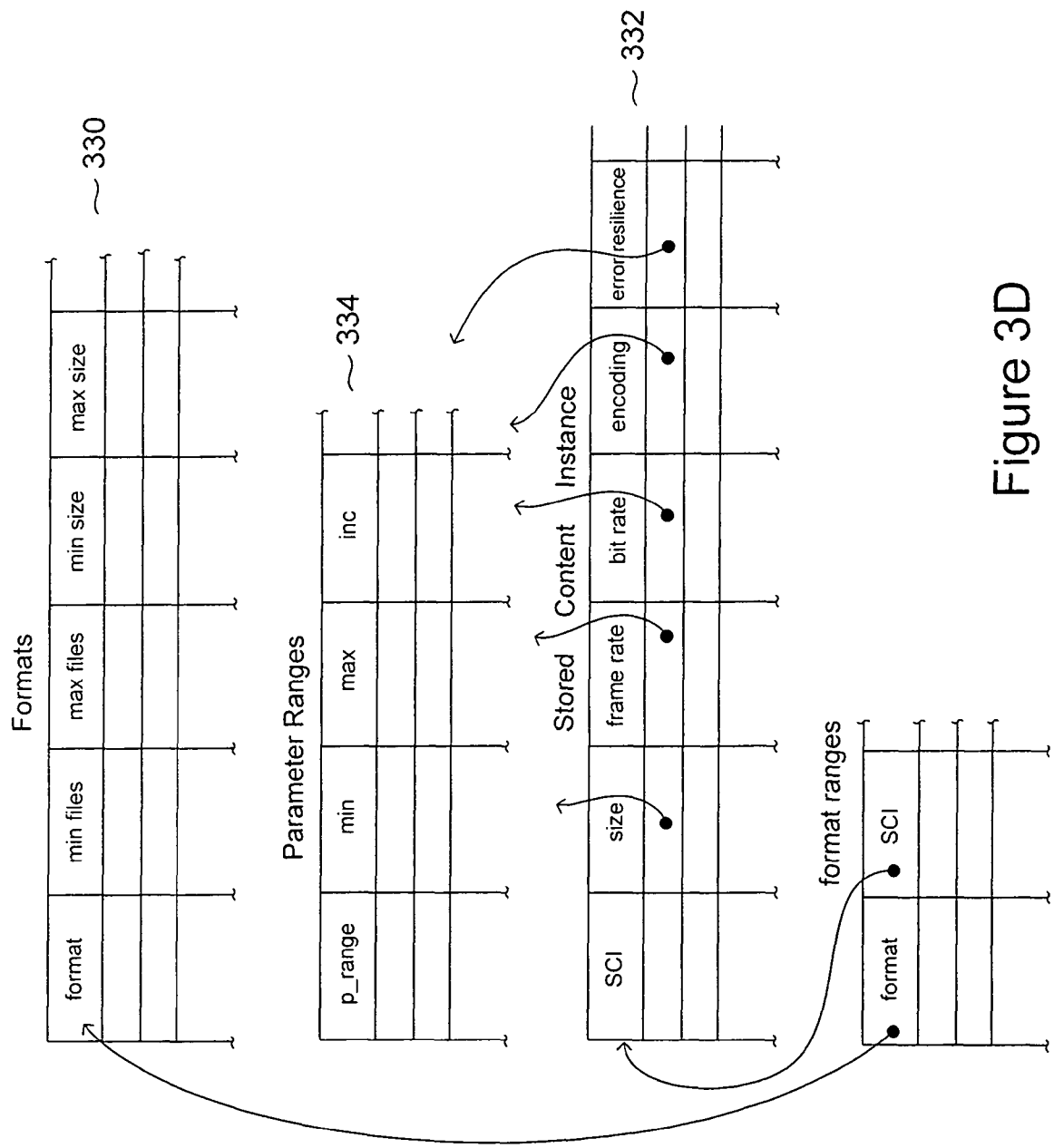

The tables shown in FIG. 3D represent the various types of content formats that may be produced and employed by the content-distribution system. Each format is represented by an entry in the formats table 330. Each particular specific content instance that may be produced for a particular format is represented by an entry in the stored content instance table 332. Each of the fields in the stored content instance table that stores a numerically encoded characteristic, beginning with the field "size," references an entry in the parameter_ranges table 334, which indicates minimum, and maximum values of a particular characteristic as well as the allowed increment within the range defined by the minimum and maximum value. Alternatively, rather than discretely representing each content instance for each format, formats can be characterized by expressions from which the ranges of characteristics that can be obtained by varying encoding parameters can be obtained.

Figure 3E:
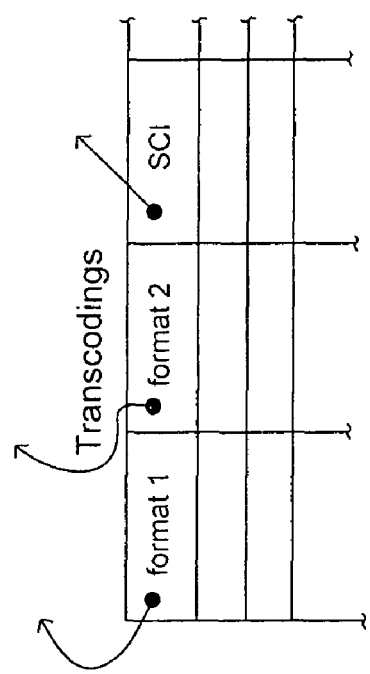
Figure 3F:
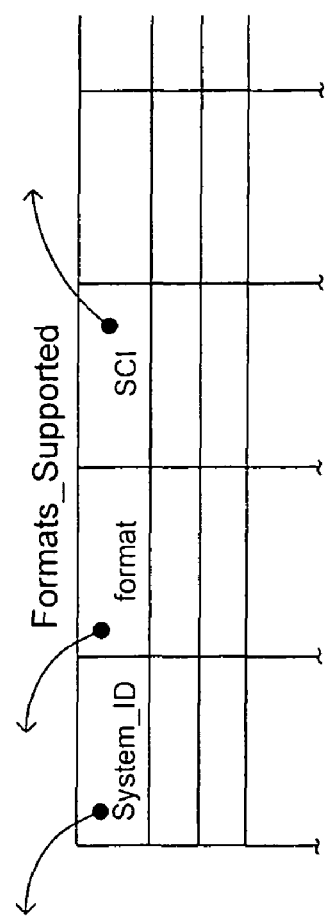

The transcodings table, shown in FIG. 3E, represents different transcodings between formats that can be carried out within a specific system or within an entire content-distribution system, depending on whether the table includes entries for a specific computer system or for all or a subset of the computer systems within a distributed content-distribution system. The format_supported table, shown in FIG. 3F, represents the various formats and encodings supported by each system or device in the content-distribution system.

Figure 3G:
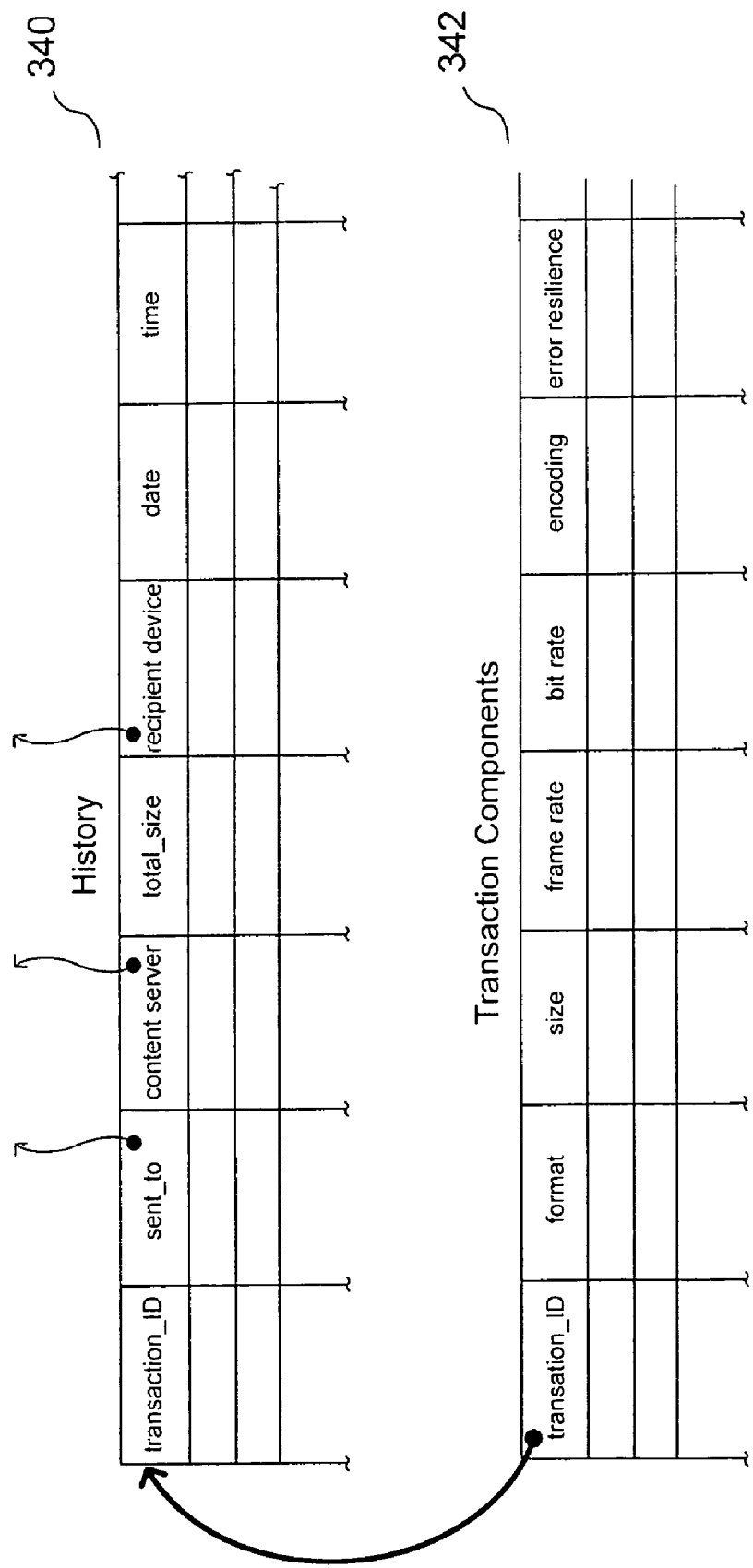
Figure 3H:
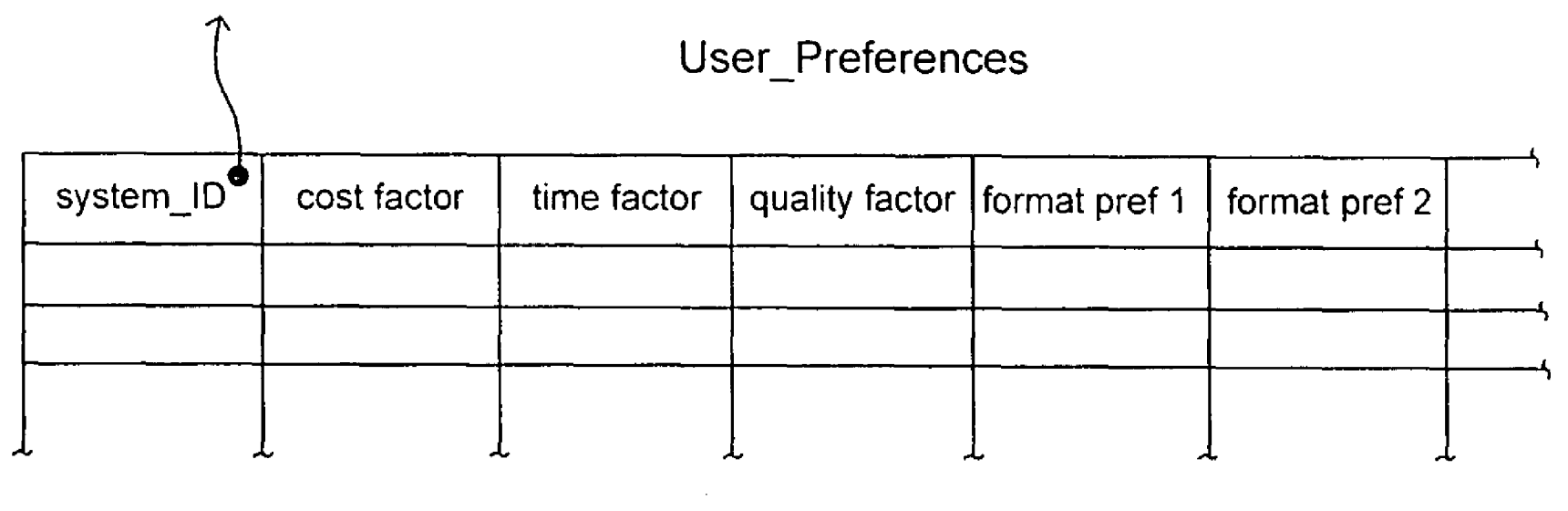

The history table 340 and transaction_components table 342, shown in FIG. 3G, represent all of the content-delivery transactions carried out by the content-distribution system, with respect to any particular server in the content-distribution system, for some period of time. Finally, the user_preferences table shown in FIG. 34 indicates user preferences specified by users associated with particular devices.

The portions of tables shown in FIGS. 3A-3H are not intended as a specific blueprint for a database representing configuration and state of a content-distribution system, but are instead intended to illustrate some of the many different possible ways in which such information can be stored. As discussed above, each computer system, or node, within a content-distribution system may maintain a global database for the entire content-distribution system, or, alternatively, may maintain only that information directly associated with the local computer system as well as a minimum amount of additional information needed to communicate with other computer systems within the hierarchical content-distribution system. An important point is that a content-distribution system, such as that shown in FIG. 1, can be self-describing when the various computer systems within the content-distribution system maintain stored information similar to that shown in FIGS. 3A-H. The stored information is sufficient to allow each computer system, or node, within the distributed content-distribution system to make local decisions that, together with the local decisions made by all other computer systems within the distributed content-distribution system, continuously drive the distributed content-distribution system to optimal or near-optimal content distribution and delivery.

Figure 4:
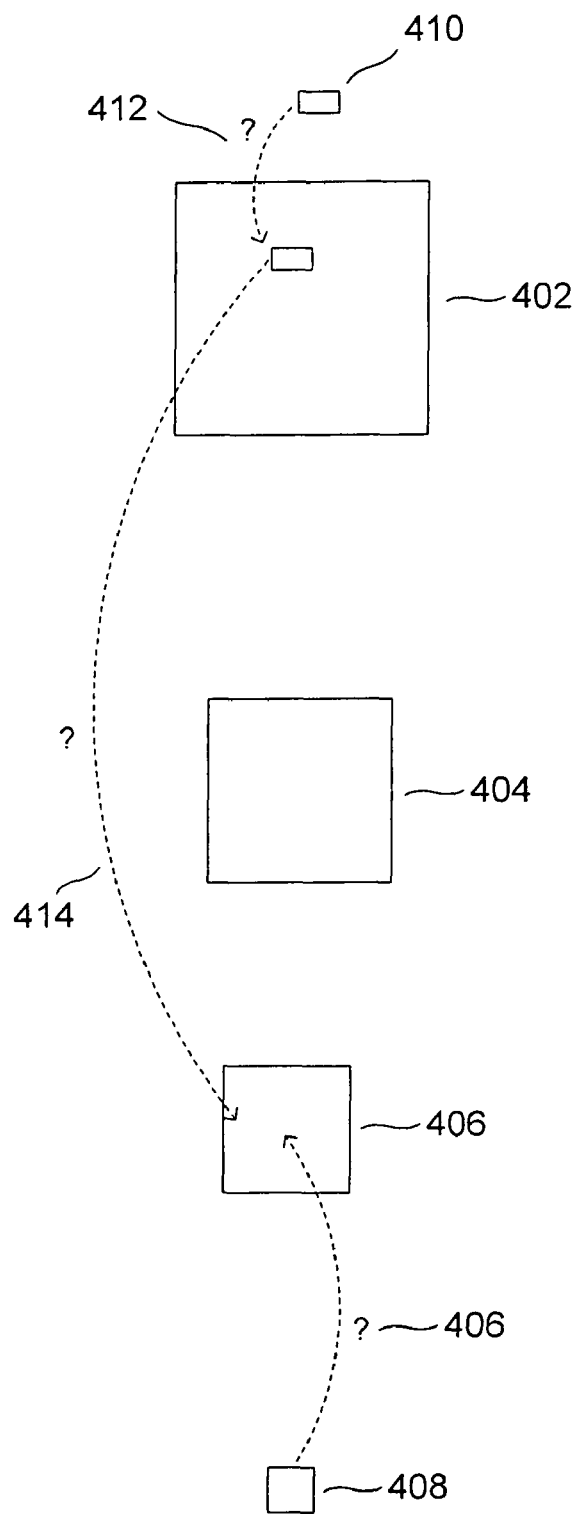
FIG. 4 illustrates three important problems that need to be addressed in order to implement and maintain an efficient distributed content-distribution system.

FIG. 4 illustrates three important problems that need to be addressed in order to implement and maintain an efficient distributed content-distribution system. FIG. 4, like FIG. 2, shows an abstract representation of a back-end server 402, an intermediate server 404, a content server 406, and a consumer-electronics device 408, which together compose a vertical slice of the hierarchical content-distribution system shown in FIG. 1.

A first problem concerns input of content objects 410 into the content-distribution system and storage of content objects within the system. Received content objects may be encoded on physical media, including DVD disks, or may be received through electronic communications as electronically transmitted data. Whatever the encoding and format of the received content object, an immediate decision 412 is where and how the content object should be stored within the content-distribution system.

A second problem is finding an optimal or near-optimal way to transmit a content object 414 to the content server 406 from which the content object is downloaded to a particular consumer-electronics device 408. In general, computer systems and communications links within a distributed content-distribution system, such as that shown in FIG. 1, have limited storage capacities and communications bandwidths. The methods by which content objects are received and stored within the content-distribution system, and the methods by which content objects are conveyed through the content-distribution system to content servers, may be largely responsible for the overall efficiency of the content-distribution system and the speed of content distribution to consumers.

A final, important problem relates to connection of a consumer-electronics device 408 to a content server 406 and initial communications 416 between the connected consumer-electronics device and the content server. There are many different types of consumer-electronic devices, and each type of consumer-electronics device may be capable of receiving and rendering only a small portion of the many content-object instances, each differently encoded using a particular encoding formats and encoded according to particular encoding parameter values, that can be produced from an initially received content object bye transcoding. It is therefore important that a content-distribution system determine, as accurately as possible, the type and configuration of a consumer-electronics device that is connected to the content-distribution system for receiving downloaded content objects. Accurate determination of the type and configuration of a consumer-electronics device allows the content-distribution system to find or generate, and to then deliver, compatible content objects to the consumer-electronics device at optimal or near-optimal efficiency and speed. By contrast, when the type of the consumer-electronics device cannot be accurately determined, the content-distribution system may not be able to deliver appropriate and compatible content objects to a particular consumer-electronics device, or may deliver content objects with less desirable characteristics, such as resolution, bit rate, and other characteristics, than would be possible by more closely matching the delivered content-object instance to the consumer electronics device and to user-desired delivered-content-object characteristics.

A content-distribution system that can address the above-discussed problems may provide optimal or near-optimal content distribution with respect to constraints such as efficiency, speed of delivery, and optimally or near-optimally fulfilling user-specified criteria for received content. In view of the enormous number of possible content-object instances that can be produced by transcoding, the enormous number of different content-object storage configurations within a distributed content-distribution system, and the many possible routes and strategies for delivering content within a distributed content-distribution system, the optimization problem may be difficult to address using classical optimization algorithms.

Figure 5:
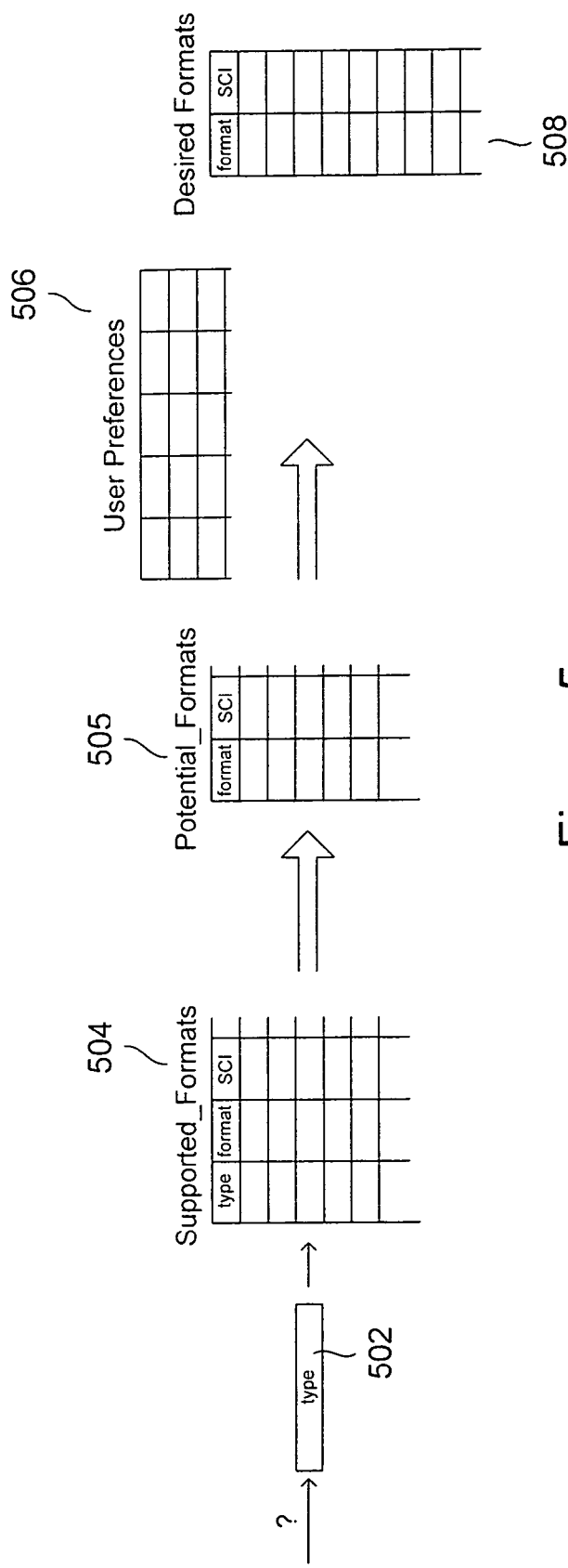
FIG. 5 illustrates the importance of accurately determining the type, configuration, and capabilities of a consumer-electronics device connected to a content-distribution system for receiving content objects from the content-distribution system.

FIG. 5 illustrates the importance of accurately determining the type, configuration, and capabilities of a consumer-electronics device connected to a content-distribution system for receiving content objects from the content-distribution system. When the type 502 of a consumer-electronics device can be determined with accuracy and precision that type can be used to accurately select the possible content-object instances that can be received and rendered by the device, produced using different encoding formats and encoding parameters, from a supported formats table. The type of a consumer electronics device may include a specification of one or more of make, model, component configuration, capacity, available storage space, control program or operating system, format compatibility, and rendering characteristics. The types of formats and encodings that can be received and rendered by the consumer-electronics device can be further constrained by user preferences 506 to produce a relatively manageably sized list of desired formats and encodings 508 for a requested content object. However, when the type cannot be accurately and precisely determined, initial selection of supported formats and encodings from the supported_formats table 504 may be relatively non-selective, leading to a much larger list of potential formats and encodings 505 that might possibly be compatible with the consumer-electronics device. Many of these potential formats and encodings may not, in fact, be compatible with the consumer-electronics device, leading to mistakes in content delivery. With possible selectivity, the problem of finding and efficiently delivering content becomes increasingly complex, due to the combinatorial explosion of different delivery strategies. Alternatively, should the type of consumer-electronics device be imprecisely determined, a content-distribution system may attempt to download a content object encoded with a format and encoding generally compatible with a group of consumer-electronics devices to which the particular consumer-electronics device is inferred to belong, but having less desirable characteristics than other formats and encodings that could be delivered to the consumer-electronics device were the type of consumer-electronics device more accurately determined. Accurate and precise determination of the type of consumer-electronics device, as well as the configuration of the consumer-electronics device, leads to precise, well-targeted requests for content objects encoded using the most optimal formats and encodings for the consumer-electronics device in view of user-specified preferences. Well-targeted and precise requests can often be satisfied more efficiently, with less inter-computer-system communications and data transfer, than for imprecise requests. Moreover, when consumers receive content in formats and encodings well tailored to their consumer-electronics devices and matching their specifications, users experience greater satisfaction and are more likely to continue to use the content-distribution system.

Figure 6:
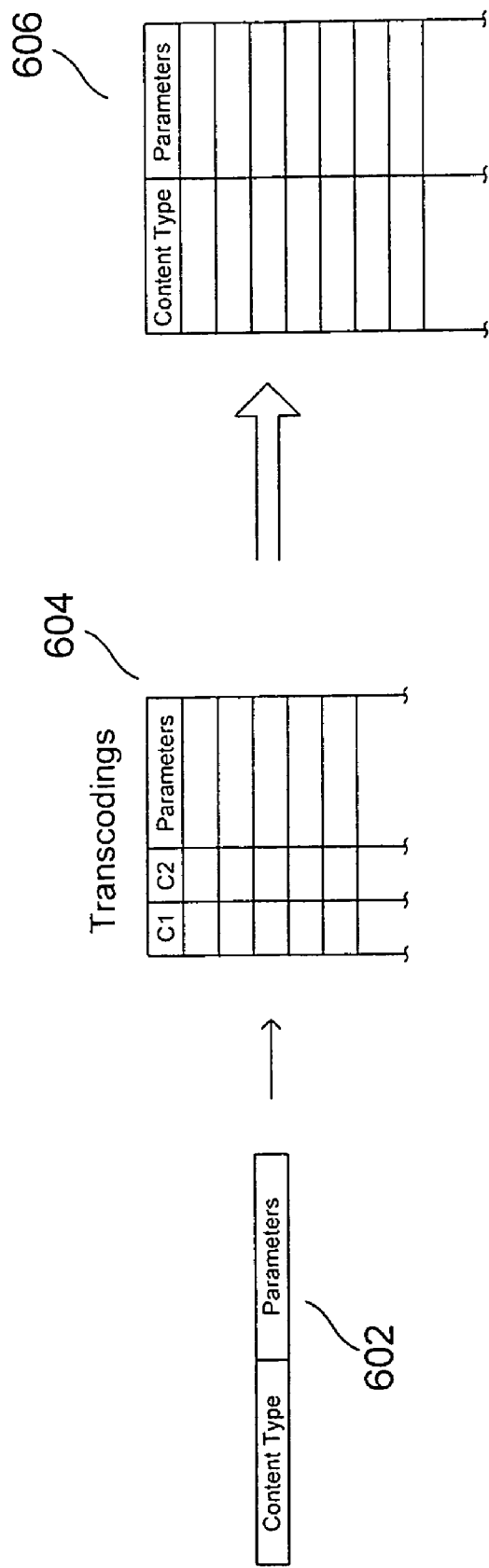
FIG. 6 illustrates one problem associated with initial content-object processing and storage within the content-distribution system.

FIG. 6 illustrates one problem associated with initial content-object processing and storage within the content-distribution system. Received content generally is encoded in a specific format using a specific encoding 602. However, when this specific format and specific encodings are used to select all possible transcodings of the received content to alternative content-object instances, via the transcodings table 604, an enormous list of possible content-object instances that can be produced from the received content object 606 may be generated. The first problem, discussed above, relates to deciding to which of the possible content-object instances the received content object should be initially transcoded for storage within the content-distribution system.

Figure 7:
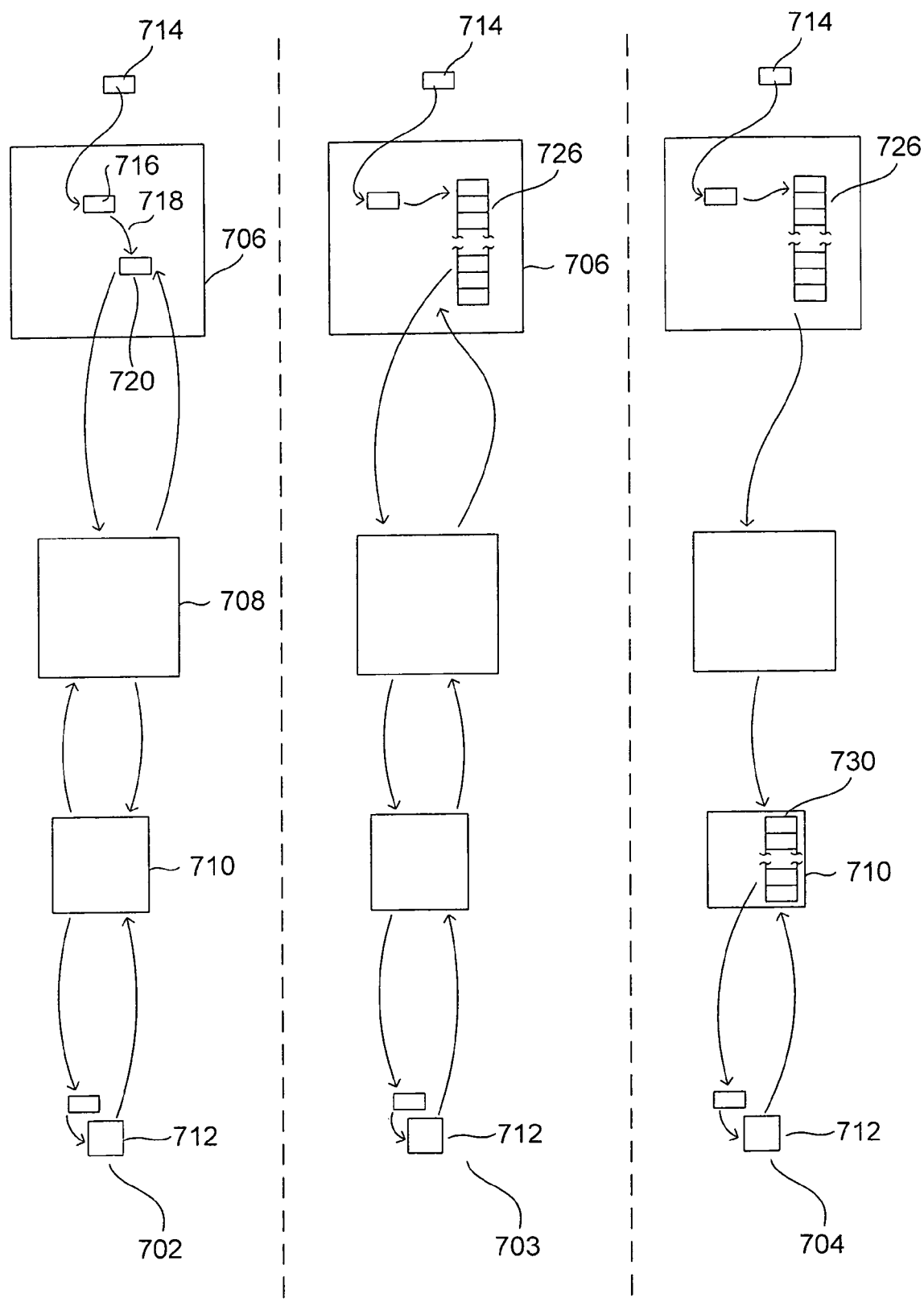
FIG. 7 illustrates various alternative approaches to received-content-object transcoding and storage.

FIG. 7 illustrates various alternative approaches to received-content-object transcoding and storage. In FIG. 7, three different approaches to content-object transcoding and storage are illustrated in three different vertical slices of a hierarchical content-distribution system 702-704. Each vertical slice, such as vertical slice 702, is shown to include a back-end server 706, an intermediate server 708, a content server 710, and a consumer-electronics device 712 connected to the content server for download of a content object. In a first approach, the received content object 714 is stored within the back-end server 706 in a single format and encoding 716. When the content object is requested by a user for download to a particular consumer-electronics device 712, the stored content object 716 is transcoded 718, on the fly, to produce a content-object instance with format and encoding compatible with both the consumer-electronics device and the user-specified criteria 720. The transcoded content-object instance is then transmitted through the intermediate server 708 to the content server 710, from which the transcoded content-object instance is downloaded to the consumer-electronics device 712. This approach minimizes the amount of storage space employed by the back-end server to store a content library. However, the cost of this approach includes the processing bandwidth needed to transcode the content object, on-the-fly, for a large fraction of requests for the content object, as well as the communications overhead involved in transmitting the transcoded content-object instance down through one or more intermediate servers to the target content server, from which the content-object instance can be downloaded to the consumer-electronics device. Thus, in the first approach, data storage is minimized, at the expense of processing and communications overheads.

In a second approach, shown as vertical slice 703 in FIG. 7, the initially received content object 714 is transcoded into a number of different content-object instances that are stored 726 within the back-end server 706. Then, when a particular consumer-electronics device 712 requests a content object, a compatible content-object instance can be selected from the already transcoded content-object instances 726 for delivery to the consumer-electronics device 712. In this approach, the processing overhead for transcoding content objects upon each request is significantly decreased or eliminated at the expense of significantly increased data-storage requirements.

In a third approach, illustrated using vertical slice 704 in FIG. 7, the received content object 714 is initially transcoded into a number of different formats and encodings stored within a back-end server 726. All or a subset of these transcodings is initially transmitted to the content server 710 and stored 730 within the content server. Then, when a particular consumer-electronics device 712 requests a particular content object, a content object with compatible format and encoding is immediately available at the content server, and can be directly downloaded to the requested consumer-electronics device. In this third approach, communications overhead between the back-end server and intermediate servers is minimized or eliminated at the expense of significantly increased data-storage requirements on the content server.

Circumstances can be imagined in which each of the three, above-discussed approaches to content storage and delivery may be optimal or near optimal. For example, in the case that a particular content object is only rarely requested, and is requested by a large number of different, incompatible consumer-electronics devices, then the first approach discussed with reference to FIG. 7 may lead to greatest overall efficiency. While the latency of content delivery is somewhat higher, due to the need to transcode the content object and transmit the content object upon each request, data-storage requirements are minimized, so that the data-storage facilities can be more effectively used to store multiple transcodings of more frequently accessed content objects. The second approach discussed with reference to FIG. 7 may be optimal or near optimal for a content-distribution system in which content servers have limited data-storage capacity, and when the particular content object is not too frequently requested. The third approach 704 discussed with reference to FIG. 7 may be optimal or near optimal for a frequently requested content objects that is requested in a number of different formats. However, it may be difficult to predict the patterns of content-object requests, processing overheads, and communications overheads that may arise within a content-distribution system with respect to any particular content object. In most cases, were a single approach to content storage and delivery selected for all content objects distributed by the content-distribution system, the approach would prove decidedly non-optimal for a significant number of content objects, leading to an inefficient and slow content-distribution system.

The various distributed content-distribution systems that represent embodiments of the present invention address all three problems discussed above with reference to FIG. 4. By addressing these problems, the distributed content-distribution systems that represent embodiments of the present invention achieve optimal or near-optimal content distribution under a variety of different loads, request patterns and frequencies, content-distribution system configurations, and for a large variety of different content-object libraries. Most significantly, solutions to the above-discussed problems may involve only local decisions and strategies within individual computer systems within the content-distribution system, rather than complex optimization methods employed globally across the content-distribution system, although global information can be used to further optimize a distributed content-distribution system that represents an embodiment of the present invention.

Figure 8:
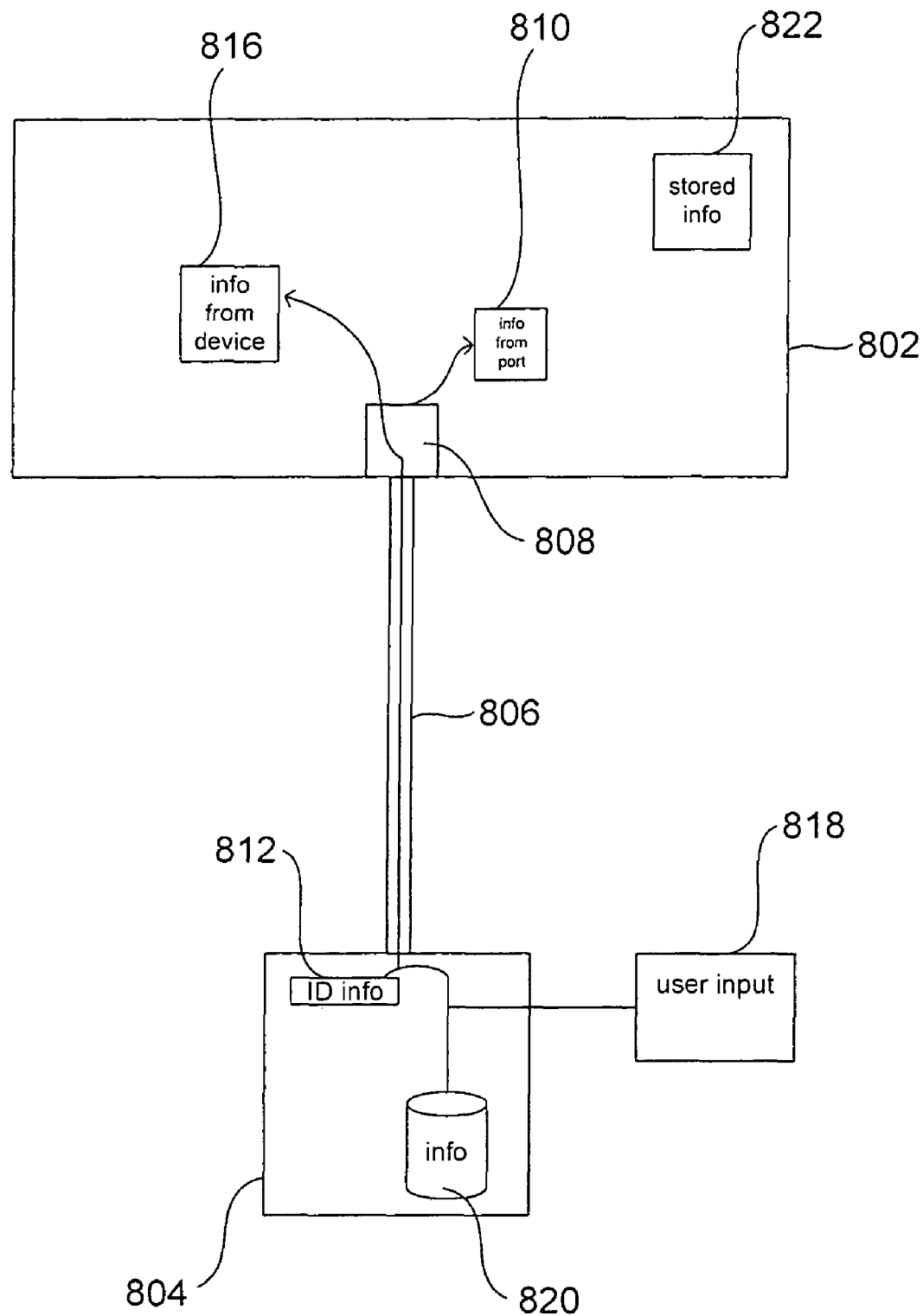
FIG. 8 illustrates the types of information that may be used by a content-distribution-system embodiment of the present invention to accurately and precisely determine the type of consumer-electronics device connected to a content server.

FIG. 8 illustrates the types of information that may be used by a content-distribution-system embodiment of the present invention to accurately and precisely determine the type of consumer-electronics device connected to a content server. In FIG. 8, the content server 802 is represented by a large block, and the consumer-electronics device 804 is represented by a smaller block. The communications connection between the consumer-electronics device and content server is represented by a vertical channel 806. A communications port 808 within the content server through which the content server exchanges data with the consumer-electronics device is represented by a small square region within the content server.

There are many different types of information that may be available to the content server upon connection of a consumer-electronics device to the content server, as indicated in FIG. 8. This information may include device-type indications returned by the communications port 810 to the content server upon connection of a consumer-electronics device to the communications link 806. For example, a universal-serial-bus ("USB") connection may provide, to the content server, a company ID and product ID of the consumer electronics device interconnected to the content server via a USB port, according to a USB host protocol. The content server can then match the company ID and product ID to values stored in database tables in order to infer the type of the consumer-electronics device, as well as characteristics of the consumer-electronics device, such as the type and capacity of the data-storage component within the consumer-electronics device, formats compatible with the consumer-electronics device, resolutions and bit rates, and other such encoding parameters compatible with the consumer-electronics device, and other such information. Alternatively, many consumer-electronics devices may store self-describing information, including various identifiers 812, which can be obtained by querying the consumer-electronics device using one or more device-access protocols. Thus, when the communications port does not provide sufficient information from which to infer the type, configuration, capacity, and capabilities of consumer-electronics device, the content server may attempt to extract stored information from the consumer-electronics device 816 by querying the device using various possible device-access protocols that may be recognized and supported by the device. An additional source of information may include user input 818 provided by a user directly to the content server or to the content server via the consumer-electronics device. For example, the content server may provide an interactive menu that allows the user to supply sufficient information for the content server to infer the type of consumer-electronics device that the user has connected. Yet additional information that may be used by the content server to infer the type of device is data stored within the consumer electronics device 820. For example, the content server may attempt to access data-storage components within the consumer-electronics device, using various possible device-component-access protocols, in order to determine the formats and encodings of content already stored within the consumer-electronics device. The content server can then infer that the determined formats and encodings are compatible with the consumer-electronics device, and may additionally be able to infer the type of consumer-electronics device or at least a class of consumer-electronics-device types that includes the consumer-electronics device. Any and all of the different types of information that may be used to infer the type of consumer-electronics device, formats and encodings of content compatible with the consumer-electronics device, storage capacity of the device, and other consumer-electronics-device identification information, is used by the content server, along with stored information 822, to precisely and accurately determine the type of consumer-electronics device. Again, the word "type" generally refers not only to indications of a manufacturer and model, but may also refer to any additional device characteristics, both static and dynamic, that can be used to select the most appropriate content-object instance to deliver to the devoice upon user request for the content object. Additional device characteristics include encoding formats and encoding parameters compatible with the consumer-electronics device, available capacity for additional content, data transfer rates, and other such information.

Figure 9:
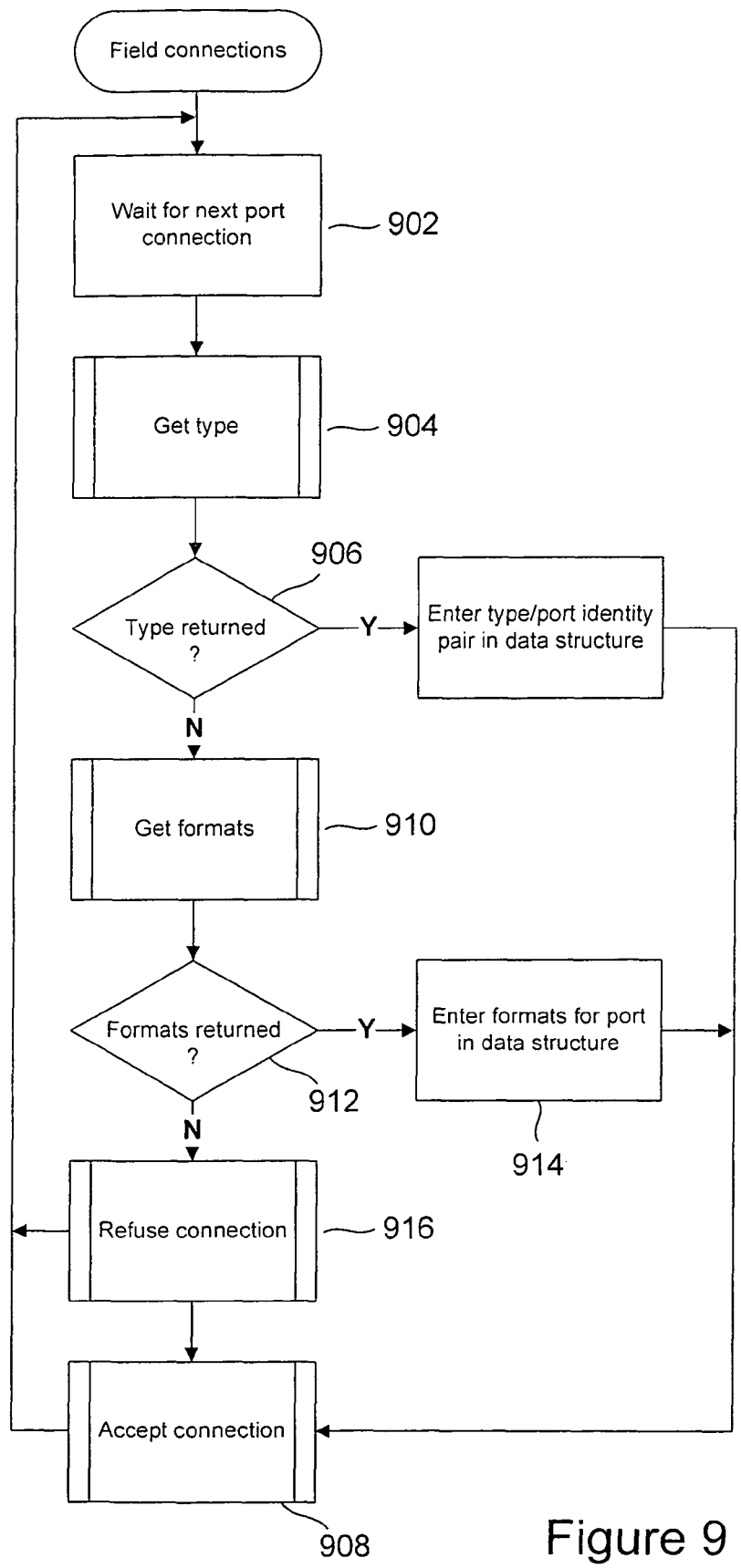
FIGS. 9-11 show control-flow diagrams that exemplify the consumer-electronics-device identification process carried out by a content server according to embodiments of the present invention.
Figure 10:
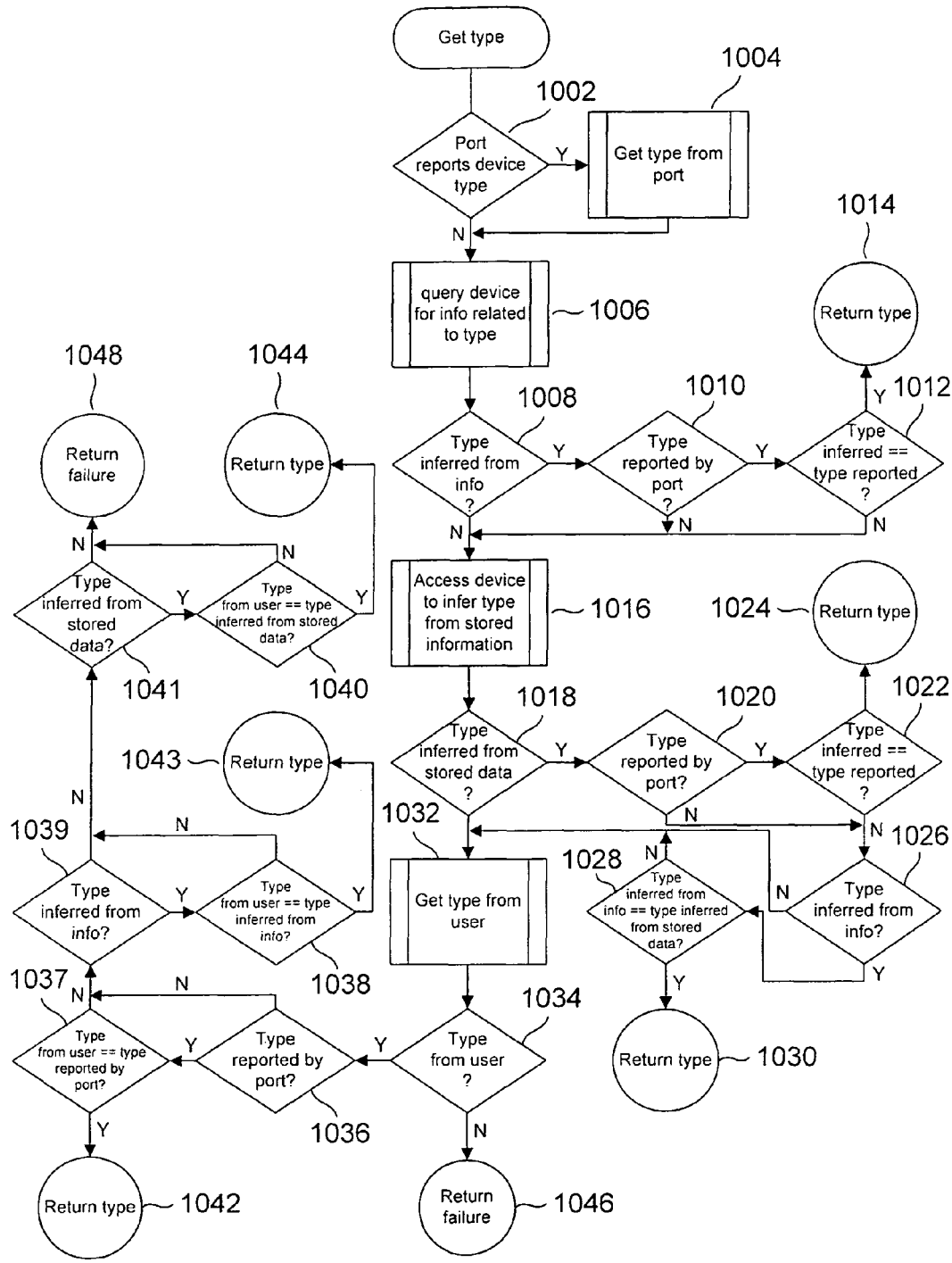
Figure 11:
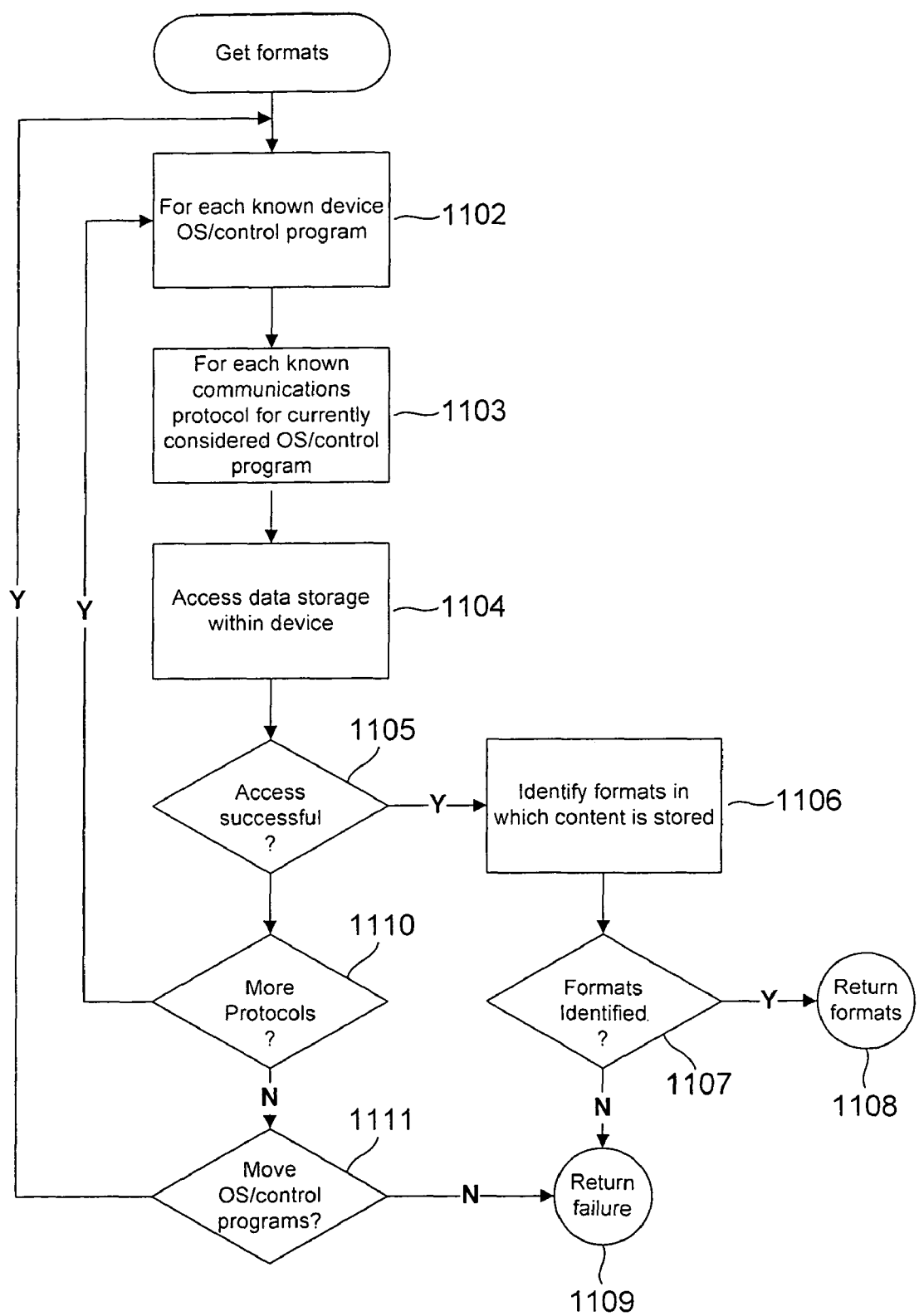

FIGS. 9-11 show control-flow diagrams that exemplify the consumer-electronics-device identification process carried out by a content server according to embodiments of the present invention. FIG. 9 shows a control-flow diagram for an event-handling loop in which new connections to a content server are recognized and processed by the content server. In step 902, the content server waits for a next connection to a port. When a connection is detected, the content server calls the routine "get type," in step 904, to obtain the type of the connected consumer-electronics device using some or all of the different types of information discussed with reference to FIG. 8. If a type is returned by the call to the routine "get type," as determined in step 906, then the type is entered, along with a port identifier and other such information, into a database or otherwise stored to allow the content server to display appropriate content objects to the user for selection and to allow the content server to locate and deliver selected content objects compatible with both the consumer-electronics device and user-specified content characteristics. The connection is then accepted by a call to the routine "accept connection" 908, which initiates and carries out interaction with the user to allow the user to browse available content, select content for download, and download content objects to the consumer-electronics device. The routine "accept connection" is not further described, both because many different possible implementations are possible, and because a description of the routine "accept connection" is not needed to describe the present invention. If the routine "get type" does not return a type, as determined in step 906, then the content server may call the routine "get formats" 910 to attempt to at least determine compatible formats and encoding parameters for content-object instances downloaded to the consumer-electronics device. If compatible formats and encodings are returned by the routine "get formats," as determined in step 912, then the compatible formats and encodings for the consumer electronics device are stored in a database or otherwise electronically stored, in step 914, and the routine "accept connection" is called to initiate user interaction with the content server. However, if no formats and/or encodings are returned from a call to the routine "get formats," as determined in step 912, then a routine "refuse connection" 916 is called to initiate a connection-refused interaction with the user to indicate to the user that the content-distribution system has failed to determine either a type for the connected consumer-electronics device or formats and/or encodings for content-object instances that would be compatible with the consumer-electronics device.

FIG. 10 shows a control-flow diagram for the routine "get type" called in step 904 of FIG. 9. In step 1002, the routine "get type" determines whether or not the communications port reports a device type, or information from which a device type can be inferred. If so, then a routine "get type from port" is called, in step 1004, to determine the type, and additionally determine the configuration and capabilities, of the consumer-electronics device using information returned from the port and stored device-type and device-capabilities information. Next, in step 1006, the routine "get type" directly queries the device for any information available from the device that would allow the content server to independently ascertain the type, and perhaps additionally ascertain the configuration and capabilities of the device, from information directly obtained from the device. If the content server can infer a type from the information obtained directly from the device, as determined in step 1008, and if a type was returned from, or inferred from information returned by, the communications port, as determined in step 1010, then if the type returned by, or inferred from information returned by, the port, is equal to the type inferred from information directly obtained from the device, as determined in step 1012, the routine "get type" returns that type in step 1014. In other words, the routine "get type," in the embodiment illustrated in FIG. 10, may use two independent type indications, or two independent sets of information from which type can be inferred, to attempt to both ascertain the type of the consumer-electronics device and to verify that type independently. In alternative embodiments of the routine "get type," a type and/or configuration and capabilities information returned by a port, or inferred from information returned by a port, may be used without further verifying the type, configuration, and capabilities by directly querying the device, when information returned by the port along with stored information is considered to be sufficiently reliable to precisely and accurately determine the type, configuration, and capabilities of a connected consumer-electronics device.

When the routine "get type" has failed to ascertain and verify the consumer-electronics-device type by querying the port and directly querying the device, then the routine "get type" may attempt to access the consumer electronics device, using various different protocols, in order to infer the type of consumer-electronics device, and possibly infer configuration and capabilities information, from information stored within the consumer-electronics device, in step 1016. In general, this information is less directly indicative of type, capabilities, and configuration information than information returned by querying the device in step 1006. As one example, the indirect information may include information about content stored within the device, information about communications protocols recognized and responded to by the device, and other such information. If a type can be inferred from information accessed by the content server in step 1016, as determined in step 1018, and if a type was reported by, or inferred from information reported by, the communications port, as determined in step 1020, and if the two types are equal, as determined in step 1022, then the type is returned in step 1024. Alternatively, when the type inferred from data accessed in step 1016 is equal to type inferred from querying the device, in step 1006, as determined in steps 1026 and 1028, then that type is returned in step 1030.

At last resort, when a type designation through information automatically collected by the content server has failed, the content server may attempt to interact with the user to obtain type information from the user in step 1032. When a type can be inferred from interaction with the user, as determined in step 1034, then if that type is equal to a type indication received by, or a type inferred from data collected by, the content server in the previous steps are equal, as determined in steps 1036-1041, then the type is returned in one of steps 1042-1044. Otherwise, when a type has not been determined and verified by the routine "get type," a failure indication is returned in either step 1046 or step 1048.

FIG. 11 shows a control-flow diagram that exemplifies steps carried out by the routine "get formats" called in step 910 of FIG. 9. The exemplary routine "get formats" comprises doubly nested for-loops of steps 1102-1111. The content server attempts to access the consumer-electronics device based on all possible combinations of OS/control-program type and communications-protocol type supported by each OS/control-program type, through the communications link connecting the consumer-electronics device to the content server, in order to access data, particularly content objects, stored within the consumer-electronics device. For any given OS/control program and protocol, if the access is successful, as determined in step 1105, then the formats and/or encoding parameters for stored content objects are identified in step 1106. If formats and/or encoding parameters are identified in step 1106, as determined in step 1107, then the formats and/or encoding parameters are returned in step 1108. Otherwise, failure is returned in step 1109.

As with any software system, there are essentially a limitless number of different implementations of the consumer-electronics-device-type determination methods illustrated in FIGS. 8-11. Relatively complex decision trees may be implemented when multiple different types of devices may be connected to a particular communications link, and when many different types of type-indicative information may be extracted from the communications port, the consumer-electronics device, and data stored within the consumer-electronics device. Thus, implementations will vary significantly with different types of content servers and content-distribution systems. However, embodiments of the present invention are characterized by robust type-determination processes that use available information to accurately and precisely identify the type, configuration, and capabilities of a consumer-electronics device connected to the content server using as much of the available type-indicative information as needed to achieve high accuracy, precision, and reliability in determining the type, configuration, capabilities, and compatibilities of a consumer-electronics-device type. As discussed above, when the type, configuration, capabilities, and compatibilities of a consumer-electronics device can be accurately and precisely determined, the content-distribution system can most efficiently locate and deliver content compatible with the consumer electronics device and with preferences specified by a user, avoiding delivery of content objects that compromise or fall short of user-specified characteristics and content objects that cannot be rendered to the user by the user's consumer-electronics device.

Methods for processing received content objects and for content delivery that address the first two problems discussed with reference to FIG. 4 are next discussed. These methods are embodied, in certain implementations, in a content-related event handler routine called from a general event handler routine run on the various computer systems within a content-distribution system.

Figure 12:
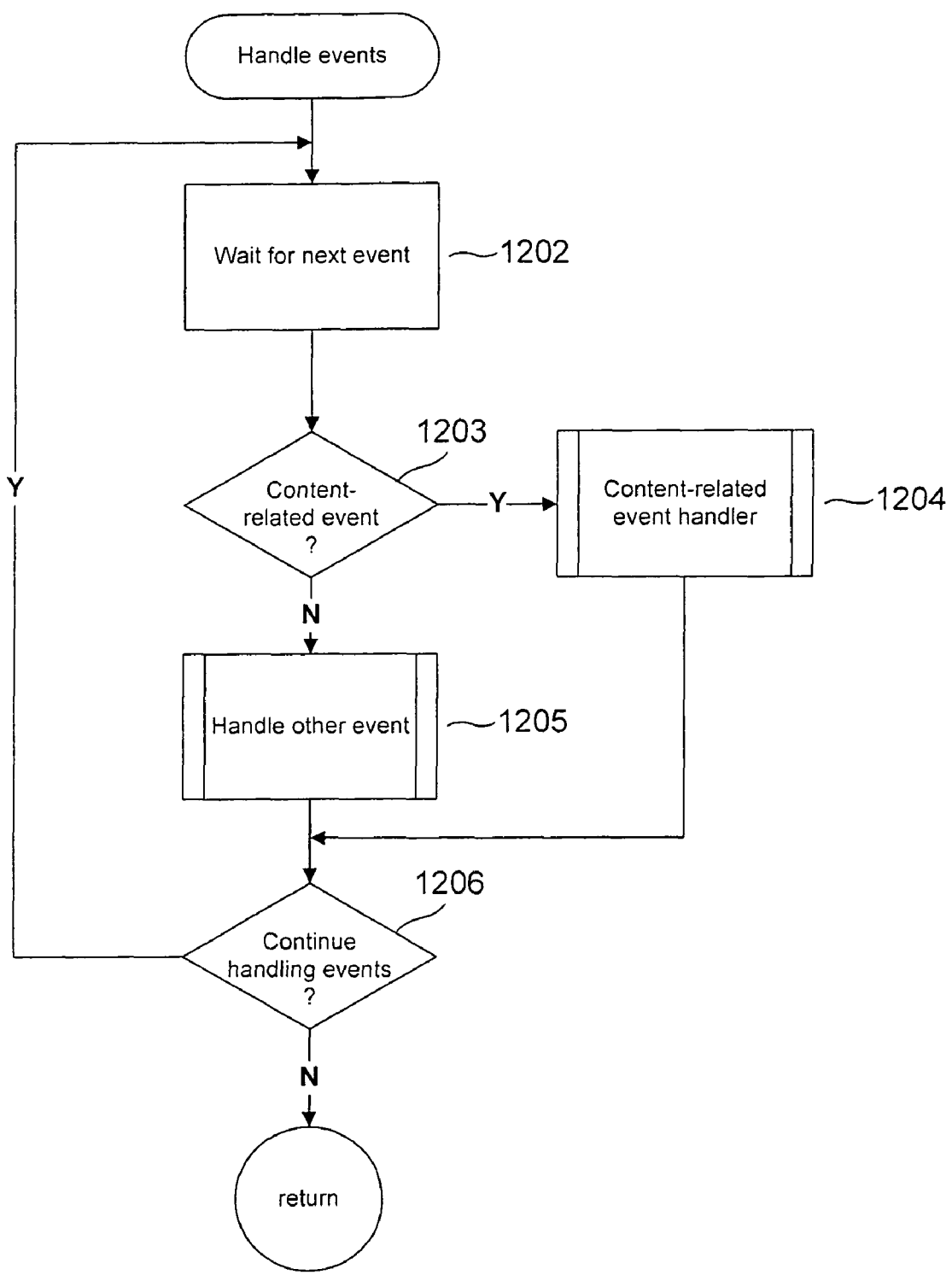
FIG. 12 shows a control-flow diagram for a general event handler that may continuously execute on each computer system within a distributed content-distribution system.

FIG. 12 shows a control-flow diagram for a general event handler that may continuously execute on each computer system within a distributed content-distribution system. In a loop comprising steps 1202-1206, the routine "handleEvents" continuously waits for a next event to occur, in step 1202, and then, in step 1203, when a next event-occurrence is detected, determines whether the event that has occurred is a content-related event or another event. If the event is a content-related event, then a content-related event handler is called in step 1204. Otherwise, another event handler is called in step 1205.

Figure 13:
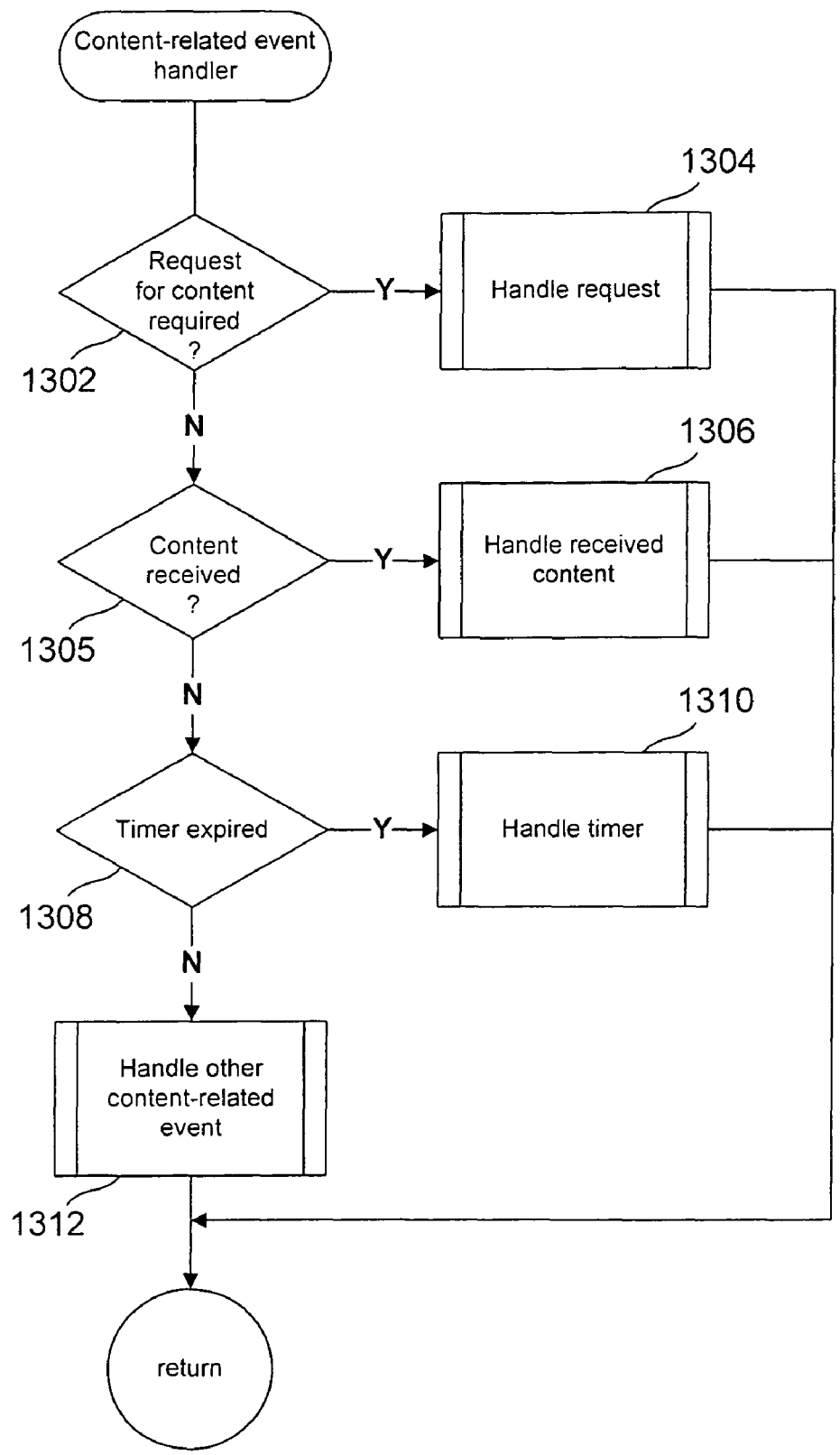
FIG. 13 shows a control-flow diagram for the routine "content-related event handler" called in step 1204 of FIG. 12.

FIG. 13 shows a control-flow diagram for the routine "content-related event handler" called in step 1204 of FIG. 12. In step 1302, the routine "content-related event handler" determines whether the recently occurred event represents a request for content received from another computer system within a content-distribution system. If so, then the routine "handle request" is called in step 1304. Otherwise, if the event corresponds to content having been received, as determined in step 1305, then the routine "handle received content" is called, in step 1306. Otherwise, if the recently occurred event is a timer expiration, or other such notification of the need for execution of a periodic maintenance function, as determined in step 1308, then the routine "handle timer" is called, in step 1310. Any other type of event is handled by a call to a generalized content-related event handler in step 1312.

Each of the three routines "handleRequest," "handleReceivedContent," and "handle timer" called in steps 1304, 1306, and 1310, respectively, in the control-flow diagram shown in FIG. 13 are discussed in detail. These three routines represent the three different components of a decision strategy carried out locally by each computer system within a distributed content-distribution system, such as that shown in FIG. 1, to achieve optimal or near-optimal content distribution.

Figure 14:
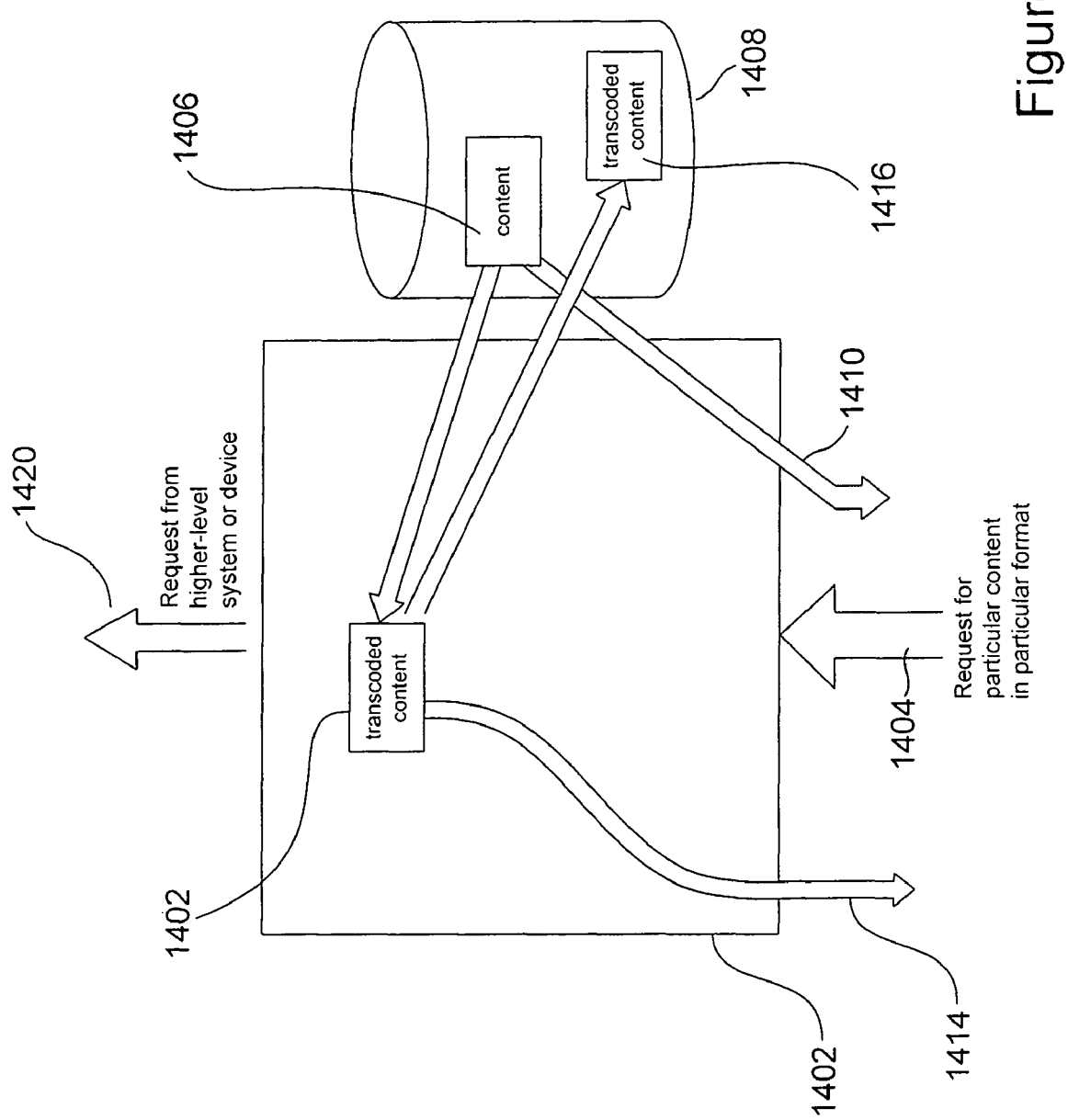
FIG. 14 illustrates responses that a computer system within a content-distribution system can make to a received request for a particular content object encoded in a particular format and according to particular encoding parameters.

FIG. 14 illustrates responses that a computer system within a content-distribution system can make to a received request for a particular content object encoded in a particular format and according to particular encoding parameters. In FIG. 14, a computer system, or node, within a distributed content-distribution system is represented by a large rectangle 1402. Arrow 1404 represents reception of a request for a particular content object in a particular format and encoded according to particular encoding parameters, or, in other words, a request for a particular content-object instance. If the content-object instance currently resides 1406 in the data-storage component within, or data-storage facility associated with, the computer system 1408, then the stored content-object instance can be retrieved and returned to the requesting computer system, as indicated by arrow 1410 in FIG. 14. Otherwise, if a content object is stored within a data-storage component of the computer system that can be transcoded into the requested content-object instance, then the stored content object can be retrieved from the data-storage component of the computer system and transcoded to produce the requested content-object instance 1412 that can then be returned to the requesting computer system, as represented by arrow 1414 in FIG. 14. Once the content object has been transcoded to produce the transcoded content-object instance 1412, the computer system may separately decide whether or not to store the transcoded content-object instance in the data-storage component or data-storage facility 1416 or allow the transcoded content-object instance to be overwritten and removed from the computer system. Finally, should the computer system not have the requested content-object instance or a content object that can be transcoded to produce the requested content-object instance, the computer system may request the requested content-object instance from another computer system within the distributed content-distribution system, as represented by arrow 1420 in FIG. 14. Thus, a computer system, in response to a request from another computer system within a content-distribution system, may directly satisfy the request using a content-object instance stored within the computer system or a content-object instance generated from a content object stored within the computer system, or may forward the request to another computer system within the content-distribution system, generally at a higher level within the content-distribution system. In addition, the computer system may store an on-the-fly generated content-object instance to prepare, in advance, to satisfy further requests for the same content object.

Figure 15:
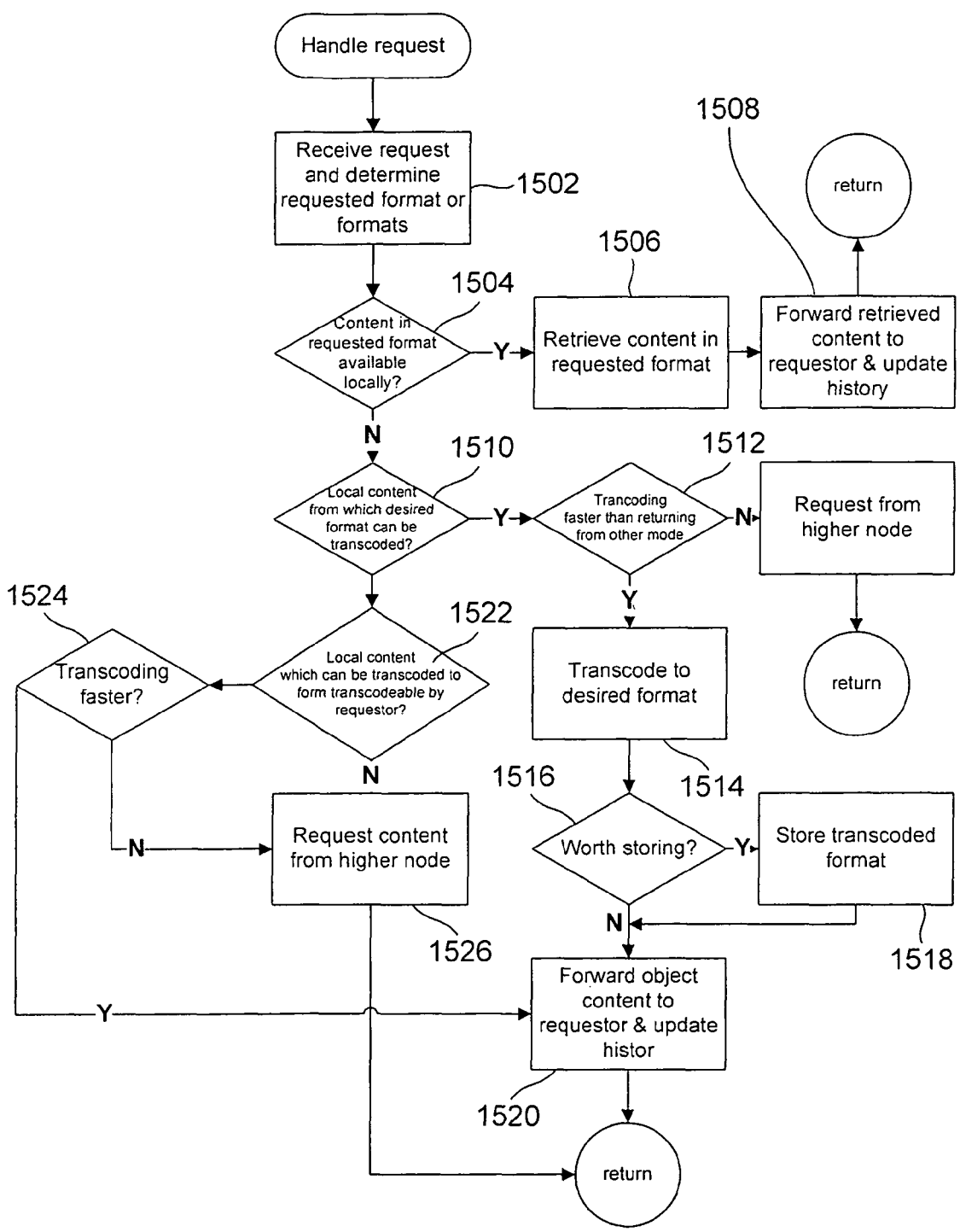
FIG. 15 shows a control-flow diagram for the routine "handle request" called in step 1304 of FIG. 13 and discussed with reference to FIG. 14.

FIG. 15 shows a control-flow diagram for the routine "handle request" called in step 1304 of FIG. 13 and discussed with reference to FIG. 14. In step 1502, a request is received from another computer system and the identification of the requested content object, requested format, and specified encoding parameters are extracted from the request. If a content-object instance is locally stored by the computer system that matches the requested content object, or that is sufficiently close to the requested content object and compatible with the user's consumer-electronics device, as determined in step 1504, then the locally stored content-object instance is retrieved, in step 1506, and forwarded to the requesting computer system in step 1508. In addition, in step 1508, any transaction history information stored within the local computer system is updated to reflect the transaction completed by forwarding the retrieved content object to the requesting computer system. History updates are carried whenever, in this and subsequently discussed flow diagrams, a content-object instance is forwarded to a computer system or device in order to satisfy a request. Otherwise, if the local computer system has stored a content object from which the requested content object can be transcoded, as determined in step 1510, and if the local computer system determines that transcoding the stored content object to generate the requested content-object instance would be faster than retrieving the requested content-object instance from another computer system, as determined in step 1512, then the routine "handle request" directs transcoding of the stored content object to the requested f content-object instance, in step 1514. Once transcoded, the routine "handle request" determines, in step 1516, whether the transcoded content-object instance should be stored for satisfying subsequent requests. If so, then the transcoded content-object instance is stored within the local computer system in step 1518. The decision as to whether to store the transcoded content object may depend on determining the frequency at which the content-object instance has been requested or, similarly, determining the number of times, during a recent period, that the content-object instance has been forwarded to another computer system by the local computer system. If the frequency exceeds a threshold frequency, then the local computer system may determine that it would be more efficient to store the transcoded content-object instance rather than continuing to generate the content-object instance on-the-fly to satisfy subsequent requests. Finally, in step 1520, the transcoded content-object instance is forwarded to the requesting computer system, and the transaction history accordingly updated. Should either the requested content object or a transcodable content object not be locally stored within the computer system, the computer system determines, in step 1522, whether there is a locally stored content object that may not be transcodable by the local computer system, but that would be transcodable by the requesting computer system. If such a locally stored content object can be found, and if it is determined to be faster for the content object to be transcoded by the requesting computer system, in step 1524, the locally stored content object is retrieved and forwarded to the requesting computer system, and the transaction history updated. Otherwise, the request for the content object is forwarded to a higher node within the distributed content-distribution system, in step 1526.

In alternative implementations, additional considerations and strategies may be employed to satisfy requests for content objects. For example, a more global view of the distributed content-distribution system may be employed, if available, by a local computer system to consider the various instances of a requested content object stored throughout the distributed content-distribution system and determine an optimal strategy for delivering the requested content object to the requesting computer system with respect to various constraints, including available processor bandwidth, communications links bandwidths, projected speed of delivery, and other such constraints. However, with reasonably stable patterns of requests and rates of requests, over modest time intervals, self-adaptation of a content-distribution system based purely on local decisions made using locally available information may nonetheless produce near-optimal content delivery.

Figure 16:
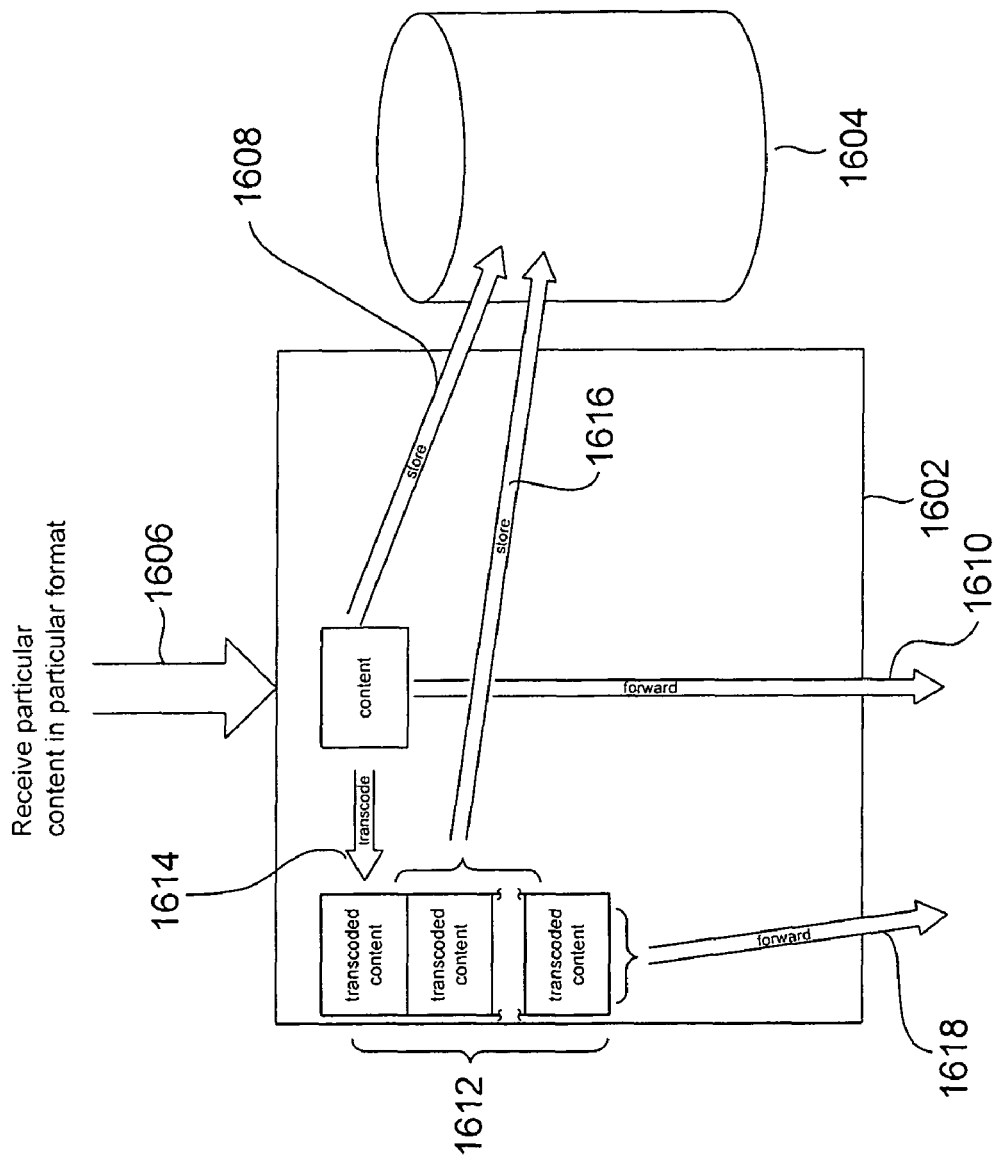
FIG. 16 illustrates actions that can be undertaken by a local computer system within a distributed content-distribution system upon receipt, by the local computer system, of a content object.

FIG. 16 illustrates actions that can be undertaken by a local computer system within a distributed content-distribution system upon receipt, by the local computer system, of a content object. FIG. 16 uses the same illustration conventions as used in FIG. 14. As in FIG. 14, the local computer system 1602 includes, or is associated with, a data-storage component or facility 1604. When a content object is received, as represented by arrow 1606, the content object can be stored in the data-storage component or facility, as represented by arrow 1608, forwarded to a computer system that previously requested the content object, as represented by arrow 1610, or may be transcoded into one or more different content-object instances encoded with the same or different formats according to various encoding parameters 1612, as represented by arrow 1614 in FIG. 16. One or more of the transcoded content-object instances can be stored in the data-storage component or facility, represented by arrow 1616 in FIG. 16, or forwarded to a requesting computer system, as represented by arrow 1618 in FIG. 16.

Figure 17:
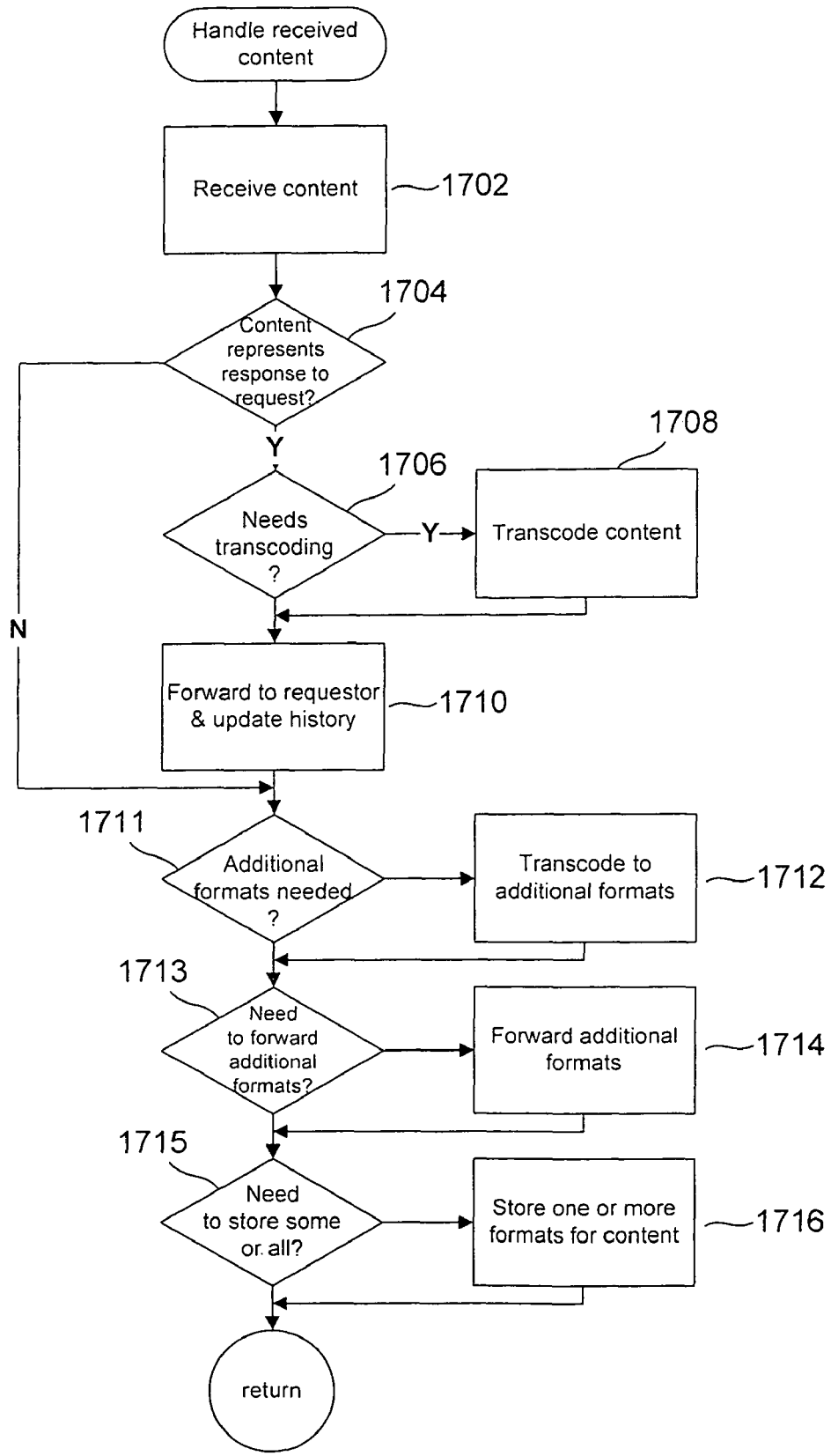
FIG. 17 shows a control-flow diagram that illustrates an embodiment of the routine "handle received content" called in step 1306 of FIG. 13 and discussed with reference to FIG. 16.

FIG. 17 shows a control-flow diagram that illustrates an embodiment of the routine "handle received content" called in step 1306 of FIG. 13 and discussed with reference to FIG. 16. In step 1702, content is received by a local computer system. If the content object represents a response to a previously submitted request for the content object, as determined in step 1704, then, in step 1706, the routine "handle received content" determines whether the received content object needs to be transcoded. If transcoding is needed, then the content object is transcoded to one or more alternative content-object instances, in step 1708. Then, in step 1710, a content-object instance matching or close to a requested content-object instance, with respect to format and encoding, is forwarded to the requester and the transaction history updated. Alternatively, if the received content object is not supplied in response to a previously submitted request for the content object, as determined in step 1704, then the local computer system may transcode the received content object into additional content-object instances, in step 1712, may forward the received content object or any additional content-object instances transcoded from the received content object to additional computer systems, in step 1714, and/or may store the received content object and/or one or more additional content-object instances transcoded from the received content object in the data-storage component or facility, in step 1716. In deciding whether or not to transcode the received content object, in step 1711, the routine "handle received content" may examine histories of transactions and global or semi-global information about the types of requests made by different content servers and the types of consumer-electronics devices connected to the content servers in order to predict the need for various alternative content-object instances encoded using the same or different formats and different encoding parameters. In deciding whether or not to forward the content object or alternative content-object instances transcoded from a content object to other computer systems within the content-distribution system, in step 1713, the local computer system may review histories of transactions and global or semi-global information to predict whether or not it would be efficient to locate the content object and/or alternative content-object instances transcoded from the content object further down in the content-distribution-system hierarchy to more efficiently satisfy expected requests at the expense of using additional data-storage capacity within lower computer systems. In deciding whether or not to store a received content object or one or more alternative content-object instances transcoded from the content object, in step 1715, the routine "handle received content" may again consult histories of previous transactions and other global or semi-global information to determine whether or not requests for the received content object or alternative content-object instances are sufficiently frequent to warrant local storage.

Figure 18:
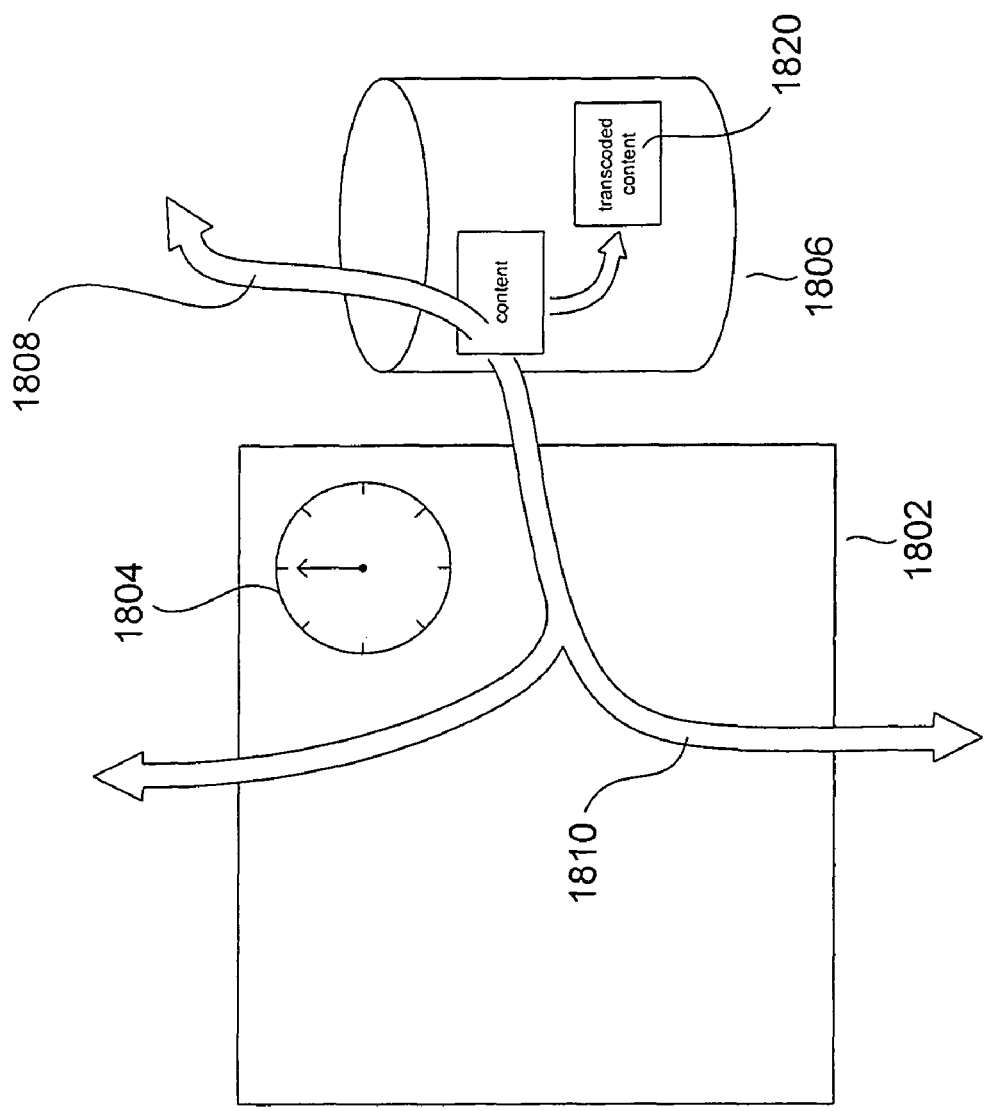
FIG. 18 illustrates various operations that may be periodically performed by a local computer system within a distributed content-distribution system.

FIG. 18 illustrates various operations that may be periodically performed by a local computer system within a distributed content-distribution system. FIG. 18 uses the same illustration conventions as used in FIGS. 16 and 14. A local computer system 1802 may periodically, upon a timer expiration 1804 or other periodic event or notification, examine some or all stored content objects within a data-storage component or facility 1806 associated with the local computer system to decide whether to delete the content object, represented by arrow 1808 in FIG. 18, forward the content object to one or more computer systems within the content-distribution system, represented by double-headed arrow 1810 in FIG. 18, or transcode the content object to create an alternative content-object instance and store that transcoded instance 1820 within the data-storage component or facility.

Figure 19:
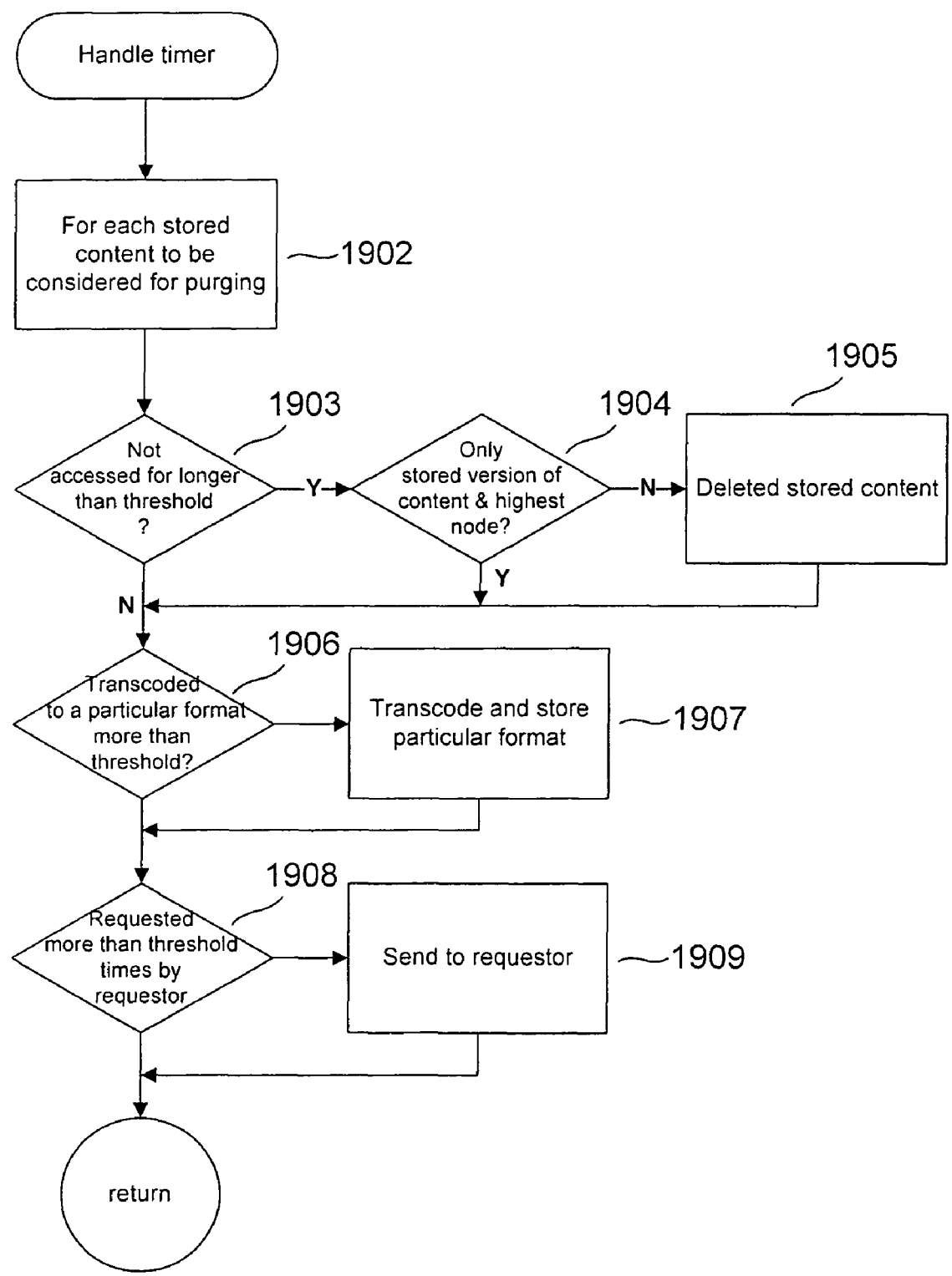
FIG. 19 shows a control-flow diagram that illustrates an embodiment of the routine "handle timer" called in step 1310 of FIG. 13 and discussed with reference to FIG. 18.

FIG. 19 shows a control-flow diagram that illustrates an embodiment of the routine "handle timer" called in step 1310 of FIG. 13 and discussed with reference to FIG. 18. Upon timer expiration, or another type of notification of need to conduct a maintenance operation, the routine "handle timer" is called. In the for-loop of steps 1902-1909, the routine "handle timer" considers all or a subset of the content objects stored within the data-storage component or facility of a local computer system within a content-distribution system. If the content object has not been accessed for longer than some threshold time, as determined in step 1903, and is not the only stored version of the content object in a highest-level node, as determined in step 1904, then the stored content object is deleted, in step 1905. Otherwise, if the stored content object has been transcoded to a particular format according to particular encoding parameters more than a threshold number of times, as determined in step 1906, then the content object may be transcoded to that particular content-object instance, in step 1907, and stored in order to be available to satisfy subsequent requests. If the content object has been requested more than threshold times from a particular requesting computer system, as determined in step 1908, then the computer system may elect to send the content object to the requester, in step 1909, directing the requester to locally store the content object to more efficiently satisfy requests at that computer system.

An essentially limitless number of alternative embodiments of the content-object processing and content-object delivery methods discussed with reference to FIGS. 12-19 are possible. Alternative embodiments may include additional strategies, considerations, and decisions to facilitate driving the self-adapting content-distribution system that employs these methods to optimal or near-optimal content delivery under observed patterns of requests, request loads, and the different content-object libraries maintained and distributed by the content-distribution system. The relational-database tables discussed with reference to FIGS. 3A-H can store sufficient information to rationally decided, at a local computer system, whether or not to carry out each of the above described actions upon receipt of a request for a content-object instance, receipt of a content-object instance, or notification of the need to conduct maintenance operations. For example, frequencies or numbers of access to a particular content-object instance can be used to determine whether or not to generate and store the content-object instance locally or to delete a locally stored copy of the content-object instance. Such frequencies are easily obtained from the tables shown in FIG. 3G.

Figure 20:
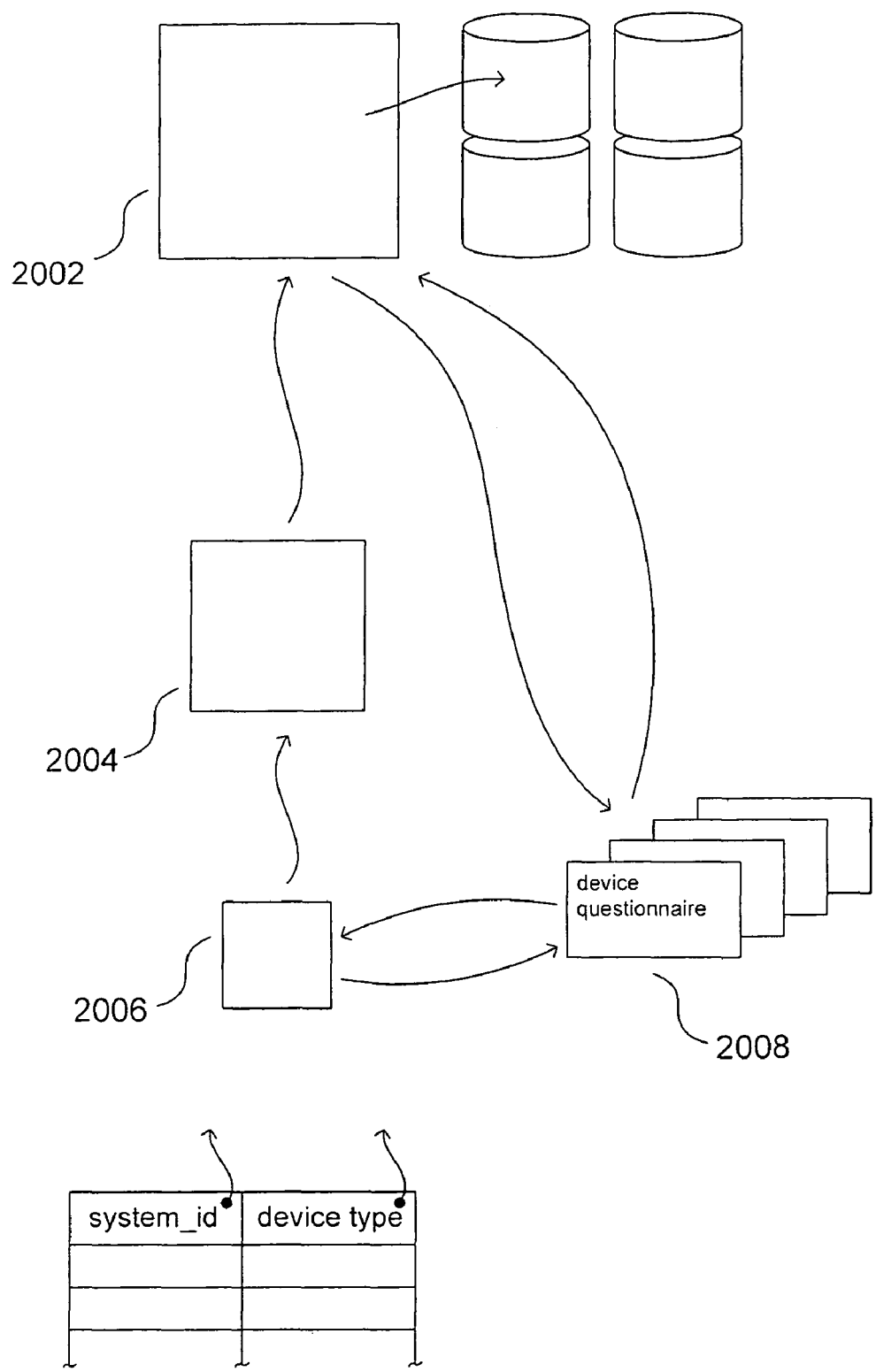
FIG. 20 illustrates an additional technique that can be used to gather information to allow back-end servers within the content-distribution system to determine whether or not to transcode received content objects to alternative content-object instances and to store the alternative content-object instances.

FIG. 20 illustrates an additional technique that can be used to gather information to allow back-end servers within the content-distribution system to determine whether or not to transcode received content objects to alternative content-object instances and to store the alternative content-object instances. FIG. 20 uses similar illustration conventions as used in FIG. 4, above, showing a vertical slice through a distributed content-distribution system that includes a back-end server 2002, an intermediate server 2004, and a content server 2006. Detailed device questionnaires 2008 can be supplied to retailers that manage content servers either directly, in physical or electronic form, or in electronic form through the content-distribution system, to solicit, from retailers, detailed information about the types of consumer-electronics devices they expect to be connected to the content server at the retail location. Such device questionnaires may be processed by the back-end server and extracted information from the questionnaires stored within the back-end server to facilitate determination of which different alternative content-object instances of a received content object should be generated and stored in order to optimally service future requests for a content object. For example, if the back-end server determines, through analyzing data supplied in the device questionnaires, that a large fraction of the content servers serviced by the back-end server expect connection to the content-distribution system of some particular subset of consumer-electronics devices having similar configurations and capabilities, then the back-end server may elect to transcode a received content object into a suitable set of alternative content-object instances coded using formats and encoding parameters expected to produce a set of alternative content-object instances that will satisfy the majority of requests for the content object expected from the large fraction of content-object servers. Thus, information obtained from device questionnaires may be used to supplement stored, historical information concerning previously satisfied requests and transactions and any other stored information that may be accumulated in order to predict future patterns of requests. This information may also be used to decide whether or not to forward particular content-object instances to lower-level intermediate servers or content servers, in order that they be more directly available to content servers expected to frequently request the content-object instances.

Figure 21:
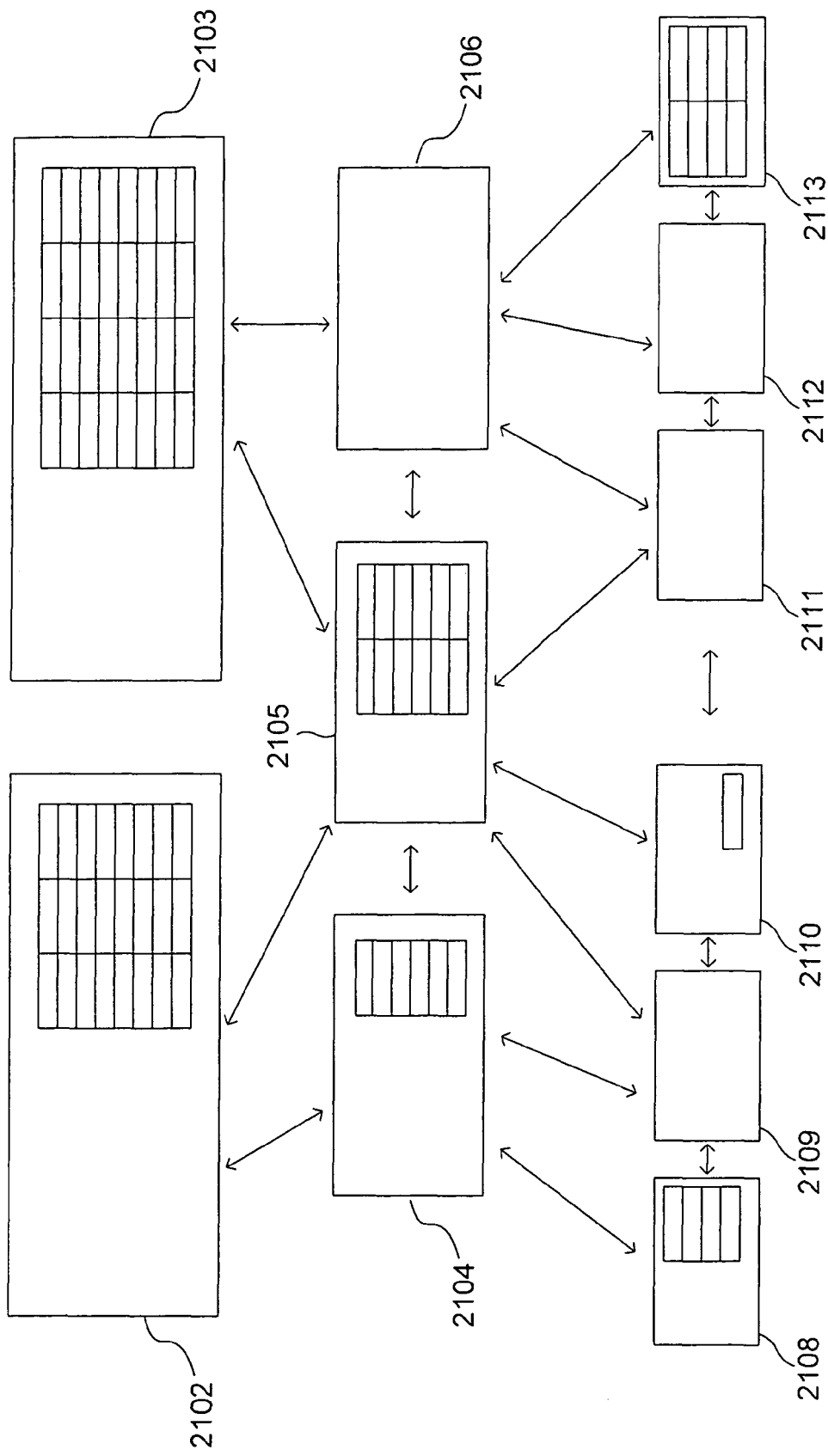
FIG. 21 illustrates, at a conceptual level, the efficient and self-adaptive content-distribution system that results from using the type-identification, content-processing, and content-delivery methods described above with reference to FIGS. 8-20.

FIG. 21 illustrates, at a conceptual level, the efficient and self-adaptive content-distribution system that results from using the type-identification, content-processing, and content-delivery methods described above with reference to FIGS. 8-20. FIG. 21 uses the same illustration conventions used in previous figures, with rectangles representing back-end servers 2102-2103, intermediate servers 2104-2106, and content servers 2108-2113. As a result of employing the above-described methods, the content-distribution system illustrated in FIG. 21 is self-adaptive and flexibly configured, with respect to content-object-instance storage. The particular content-object instances stored at each node within the content-distribution system may vary from node to node, and may change dynamically, over time, in response to demand from users for content objects. In certain cases, such as content servers 2108 and 2113, a content server may store a significant number of content-object instances generated from a particular content object. In other cases, such as content servers 2109, 2111, and 2112, the content servers may not store any instance of a particular content object, instead relying on higher-level nodes for storage, generation, and delivery. A back-end server may choose to store the bulk of the content-object instances for a particular content object, such as back-end server 2103, while another back-end server, such as back-end server 2102, may choose to store a smaller number of content-object instances, relying on on-the-fly transcoding and/or storage in intermediate servers 2104 and 2105 to satisfy requests for content-object instances related to the content object. When the types of consumer-electronics devices connected to content servers can be precisely identified, content objects that satisfy requests from the consumer-electronics devices can be efficiently located or produced within the content-distribution system for efficient delivery to the content server to which the consumer-electronics device is connected.

Although the present invention has been described in terms of particular embodiments, it is not intended that the invention be limited to these embodiments. Modifications within the spirit of the invention will be apparent to those skilled in the art. For example, as discussed above, any number of different implementations of the consumer-electronic-device-type determination, content-processing, and content-delivery methods discussed above with reference to FIGS. 8-20 can be obtained by employing different programming languages and varying different programming parameters, such as modular organization, control structures, data structures, and other programming parameters. More complex, additional decision trees and decision strategies may be incorporated into a content-distribution system to facilitate a faster and closer approach to optimal content distribution and delivery. Many different tradeoffs between relying exclusively on local information, relying on global information, transcoding and storing transcoded content-object instances, and other operations and activities may be considered in order to drive the behavior of a content-distribution system towards optimality under a variety of different demand and load conditions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A distributed content-distribution system comprising:
one or more system servers that each stores content-object instances; and
one or more kiosk-like content servers in retail locations that each
  stores content-object instances,
  requests content objects from one or more of the system servers,
  connects to a consumer-electronics devices on behalf of a user,
  determines the type of the connected consumer-electronics device,
  receives, from users, requests for download of content objects to the users' consumer-electronics device, and
  responds to each request for download of a content object to a user's consumer-electronics device by one of:
  requesting a content-object instance compatible with the user's request and compatible with the user's consumer-electronics device from a system server,
  retrieving, from a data-storage component within, or from a data-storage facility associated with, the kiosk-like content server, a content-object instance compatible with the user's request and compatible with the user's consumer-electronics device and downloading the retrieved content-object instance to the user's consumer-electronics device, and
  retrieving a content-object instance from the data-storage component or the data-storage facility and transcoding the retrieved content-object instance to generate a content-object instance compatible with the user's request and compatible with the user's consumer-electronics device;
wherein the system servers include one or more back-end servers;
wherein the system servers, the kiosk-like content servers, and the consumer-electronics devices are hierarchically organized, with the consumer-electronics devices at a lowest level, with the one or more kiosk-like content servers at a next-to-lowest level in the hierarchy, and the one or more backend servers at a highest level in the hierarchy;
wherein each request for a content object is received from a user by the one or more kiosk-like content server at the next-to-lowest level; and
wherein, when a kiosk-like content server, in response to a received request for a content object, requests the content object from a system server, the request for the content object forwarded upward through the hierarchically organized system servers.

2. The distributed content-distribution system of claim 1 wherein the system servers include the one or more back-end servers at the highest level and one or more intermediate servers at each of one or more intermediate levels below the highest level comprising one or more back-end servers and above the next to-lowest level comprising one or more kiosk-like content servers; and wherein a request for a content object received by a kiosk-like content server may be forwarded through one or more intermediate servers at one or more intermediate levels to a back end server at the highest level.

3. The distributed content-distribution system of claim 2 wherein each server selected from among the one or more kiosk-like content server, intermediate server, and back-end server, upon receiving a content object:

determines, from stored data, whether or not to transcode the received content object;

determines, from stored data, whether or not to locally store the received content object; and determines, from stored data, whether or not to forward the received content object to a lower-level server or consumer electronics device.

4. The distributed content-distribution system of claim 3 wherein, when the sever determines to transcode the received content object, the server determines to which type or types of content-object instances to transcode the received content object and, for each content-object instance produced by transcoding the received content object, the server determines whether to locally store the content-object instance and whether or not to forward the content-object instance to a lower-level server of consumerelectronics device.

5. The distributed content-distribution system of claim 2 wherein each server selected from among the one or more kiosk-like content server, intermediate server, and back-end server, upon receiving a request for a content object from a lower-level requestor:

determines whether a locally stored content-object instance satisfies the request for the content object, and, when the locally stored content-object instance satisfies the request for the content object, retrieves the locally stored content-object instance and returns the retrieved content-object instance to the lower-level requestor;

when no locally stored content-object instance satisfies the request for the content object, determines whether a locally stored content-object instance can be transcoded locally to a content-object instance that satisfies the request for the content object, and, when a the locally stored content-object instance can be transcoded locally to a content-object instance that satisfies the request for the content object, retrieves the locally stored content-object instance, transcodes the retrieved content-object instance to the content-object instance that satisfies the request, returns content-object instance that satisfies the request to the lower level requestor as well as optionally locally storing the content-object instance that satisfies the request; and when no locally stored content-object instance satisfies the request for the content object and when no locally stored content-object instance can be transcoded locally to a content-object instance that satisfies the request for the content object, requests the content object from a higher-level server.

6. The distributed content-distribution system of claim 2 wherein each server selected from among the one or more kiosk-like content server, intermediate server, and back-end server, periodically evaluates locally stored content-object instances for deletion.

7. The distributed content-distribution system of claim 2 wherein, by continuously determining whether or not to locally transcode store content-object instances, whether or not to locally store content-object instances, and whether or not to delete locally stored content object instances, the kiosk-like content servers, intermediate servers, and back-end servers that together compose the distributed content-distribution system optimally or near-optimally deliver content-object instances to requesting users' consumer-electronics device.

8. The distributed content-distribution system of claim 1 wherein a kiosk-like content server determines the type and, when possible, the configuration, capacity, and compatibilities with digital encodings, of a connected consumer-electronics device from one or more of: data supplied by a communications interface to the consumer-electronics device; data obtained by querying the consumer-electronics device using a communications protocol recognized by the consumer-electronics device; data obtained by accessing the consumer-electronics device using a communications protocol recognized by the consumer-electronics device, an operating-system or control rogram interface provided by the consumer-electronics device, including accessing content object instances stored within the consumer electronics device; and data supplied by user.

9. The distributed content-distribution system of claim 8 wherein the kiosk-like content server independently determines the type of a connected consumer-electronics device from first data and verifies the type determination from second, different data.

\* \* \* \* \*

UNITED STATES PATENT AND TRADEMARK OFFICE
CERTIFICATE OF CORRECTION

| | | |
|---|---|---|
| PATENT NO. | : 7,779,064 B2 | |
| APPLICATION NO. | : 11/974918 | |
| DATED | : August 17, 2010 | |
| INVENTOR(S) | : Mark E. Phillips | |

It is certified that error appears in the above-identified patent and that said Letters Patent is hereby corrected as shown below:

Col. 23, claim 4, line 27, replace "consumerelectronics" with --consumer electronics--;
Col. 23, claim 5, line 43, delete "a";
Col. 24, claim 8, line 37, replace "rogram" with --program--.

Signed and Sealed this
Twenty-eighth Day of December, 2010

David J. Kappos
*Director of the United States Patent and Trademark Office*